United States Patent
Shurling et al.

(10) Patent No.: US 6,424,951 B1
(45) Date of Patent: *Jul. 23, 2002

(54) DATA PROCESSING TECHNIQUE FOR SCORING BANK CUSTOMER RELATIONSHIPS AND AWARDING INCENTIVE REWARDS

(75) Inventors: Larry W. Shurling, Barnesville, GA (US); Gregory R. Nimis, St. Paul, MN (US); Granville S. Reagle, Littleton, CO (US); Darlene M. Motschenbacher, Burnsville; Wayne P. Hansen, Shakopee, both of MN (US)

(73) Assignee: The Harrison Company, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/406,388

(22) Filed: Sep. 27, 1999

Related U.S. Application Data

(63) Continuation of application No. 07/808,324, filed on Dec. 16, 1991.

(51) Int. Cl.[7] .......................... G06F 17/60; G06F 17/00
(52) U.S. Cl. ............................. 705/14; 705/35; 705/38
(58) Field of Search .............................. 705/14, 35, 38

(56) References Cited

U.S. PATENT DOCUMENTS

| | | | | |
|---|---|---|---|---|
| 4,885,685 A | * | 12/1989 | Wolfberg et al. | 705/14 |
| 5,025,372 A | * | 6/1991 | Burton et al. | 705/14 |
| 5,056,019 A | | 10/1991 | Schultz et al. | |
| 5,214,579 A | * | 5/1993 | Wolfberg et al. | 705/36 |
| 5,297,026 A | * | 5/1994 | Hoffman | 364/408 |
| 5,875,437 A | * | 2/1999 | Atkins | 705/40 |
| 6,009,415 A | * | 12/1999 | Schurling et al. | 705/35 |
| 6,195,644 B1 | * | 2/2001 | Bowie | 705/14 |
| 6,202,054 B1 | * | 3/2001 | Lawlor et al. | 705/42 |

FOREIGN PATENT DOCUMENTS

| GB | 2251098 | * 6/1992 | ........... G06F/15/30 |
|---|---|---|---|

OTHER PUBLICATIONS

Quinn, Jane Bryant, "Beware The Bankers' Squeeze on Some Credit Card Accounts", San Jose Mercury News, Jun. 4, 1989, p. 5E (full article).*
Quinn, Jane Bryant. Beware the Banker's Squeeze on sone Credit Card Accounts. Jun. 4, 1989. San Jose Mercury News, p. 5E.*
TWA the Frequent Flight Bonus Program, 1987.
Sun, "Checking Out the Customer," Washington Post.
Wall Street Journal 3 Star, Eastern, "Grocery Stores Copy Airlines with Frequency Buyer Bonuses," Aug. 7, 1986, p. 21.
PR Newswire, Anaheim, CA, Jun. 16, 1989; "Catalina Marketing Corp. Outmaneuvers Citicorp POS, . . . " pp. 1 & 2.

(List continued on next page.)

*Primary Examiner*—Eric W. Stamber
*Assistant Examiner*—James W. Myhre
(74) *Attorney, Agent, or Firm*—Dorsey & Whitney, LLP

(57) ABSTRACT

A Relationship scoring and Incentive Reward awarding process determines a Relationship score for the Relationships between a Bank and each of its customers. Such Relationships may include deposit accounts, loan accounts, and customer referrals. Customer data describing the Relationship between the Bank and its customers is furnished by the customers and extracted from a Bank customer information file. Incentive Rewards, such as reduced loan rates or increased deposit account interest, are awarded to customers based on the Relationship scores. Management reports summarize the Relationships between the Bank and its customers and provide marketing information.

2 Claims, 17 Drawing Sheets

OTHER PUBLICATIONS

The Harrison Library, Ref. #1, 1988 (21 pages).
The Harrison Library, Ref. #2, 1989 (64 pages).
News Release, First National Bank of Clarion, Iowa, Jun. 2, 1990.
Loyalty Banking Program, Loyal Customer Reward Program, $1^{st}$ Nat'l. Bank, Clarion, Jun. 1990.
Welcome to the World of Frequent Flyer, American Banker, Franzoni, Sep. 13, 1990.

* cited by examiner

Fig_1

Fig_2

Fig_3

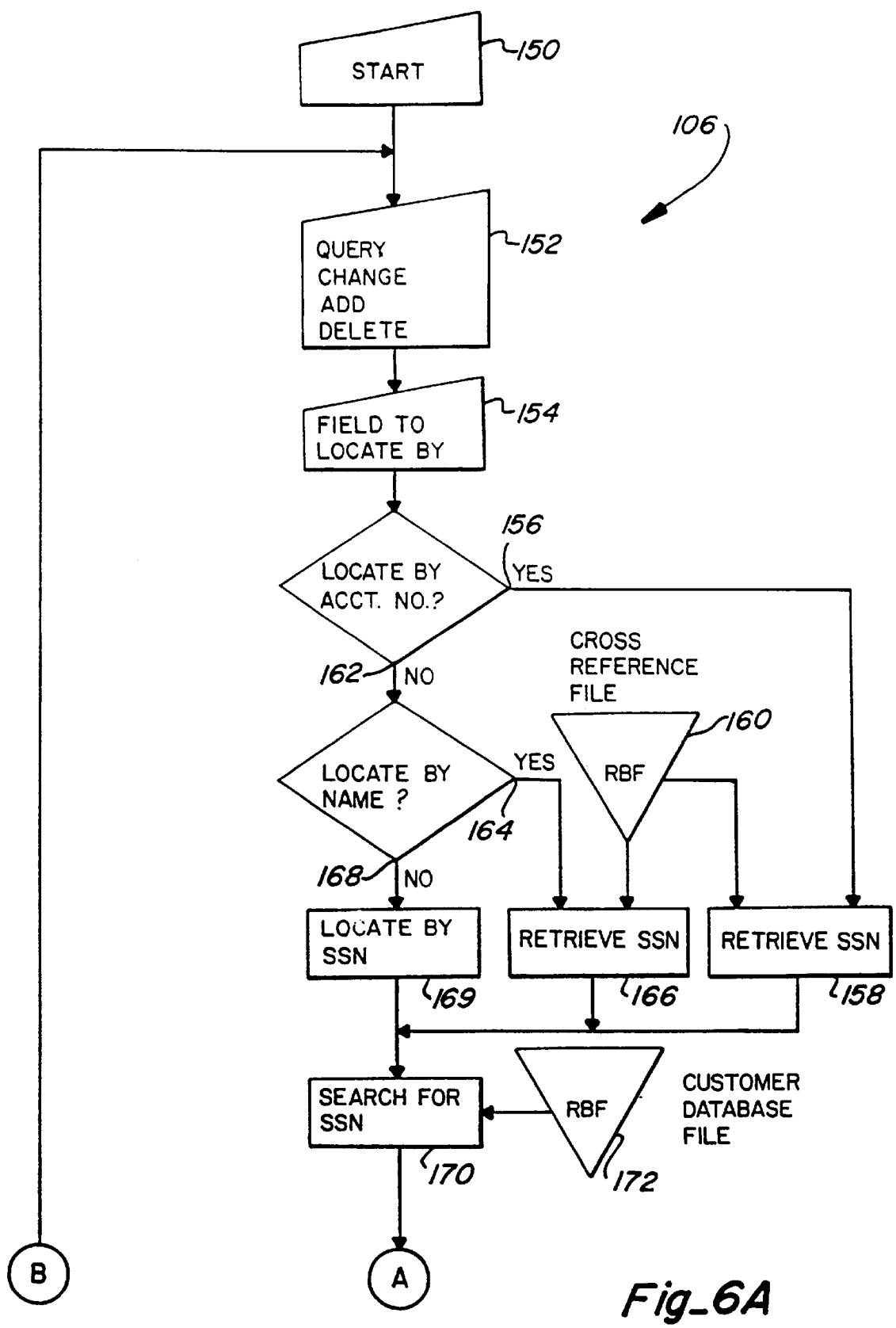
Fig_6A

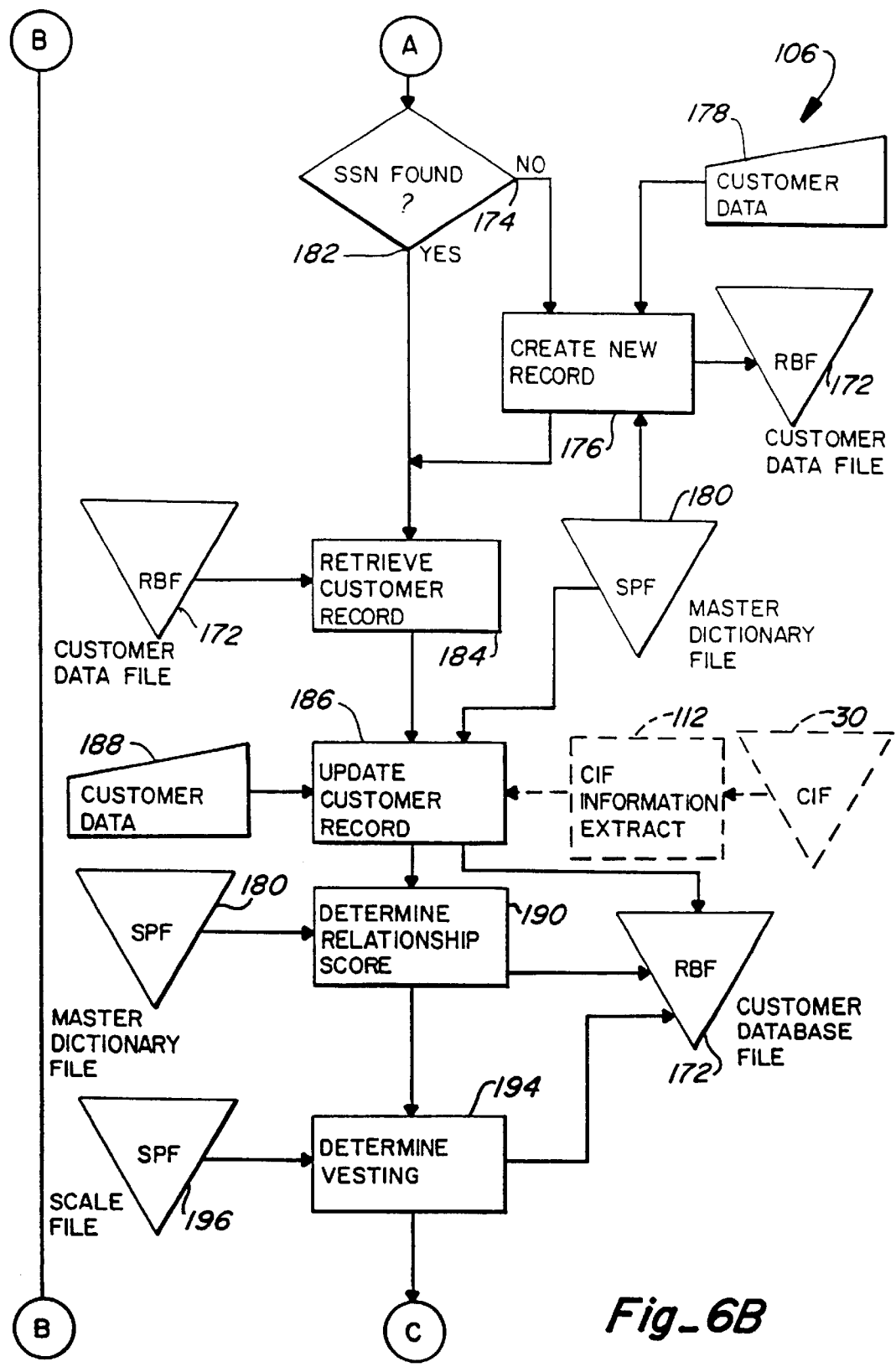
Fig_6B

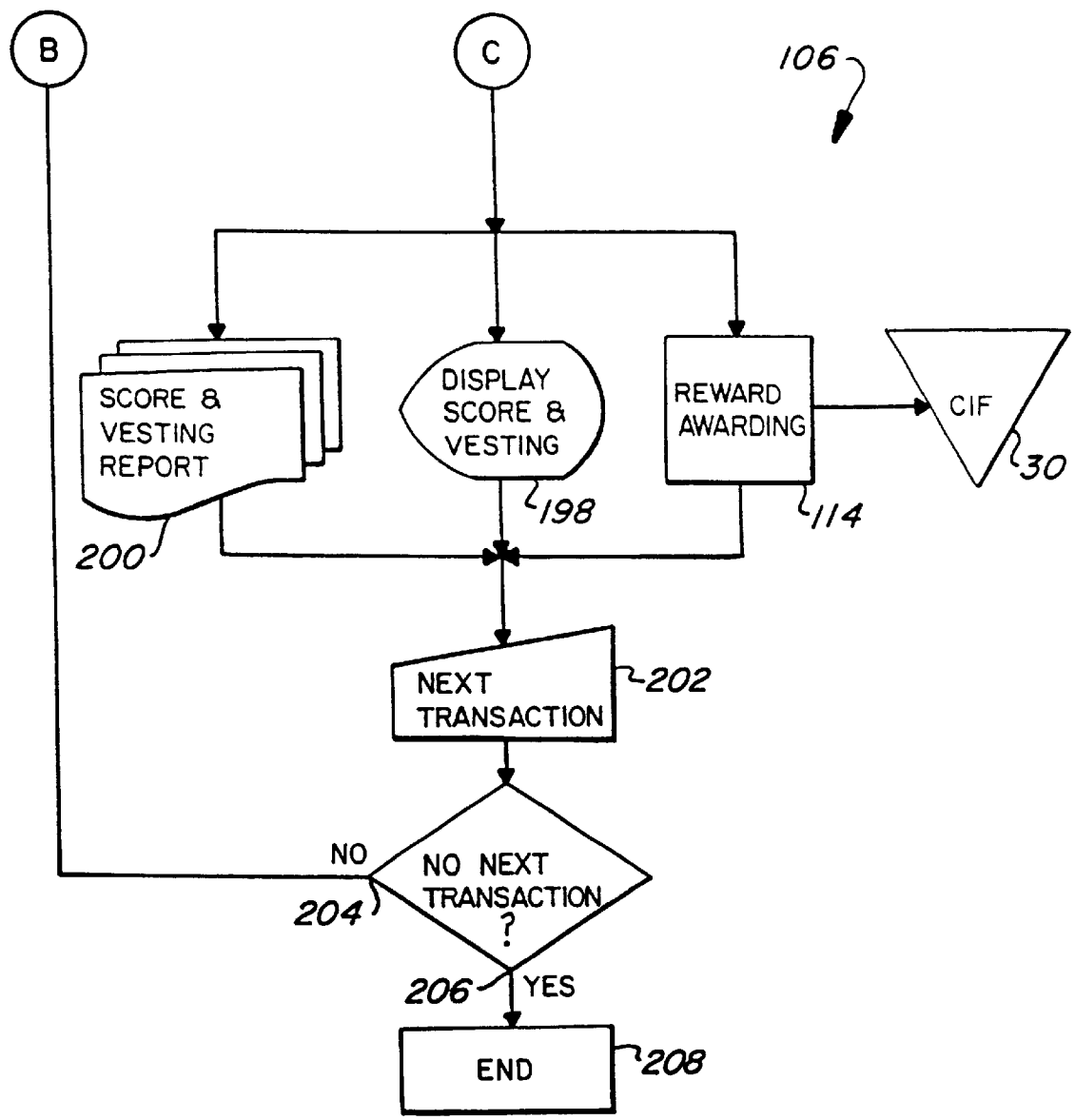
Fig_6C

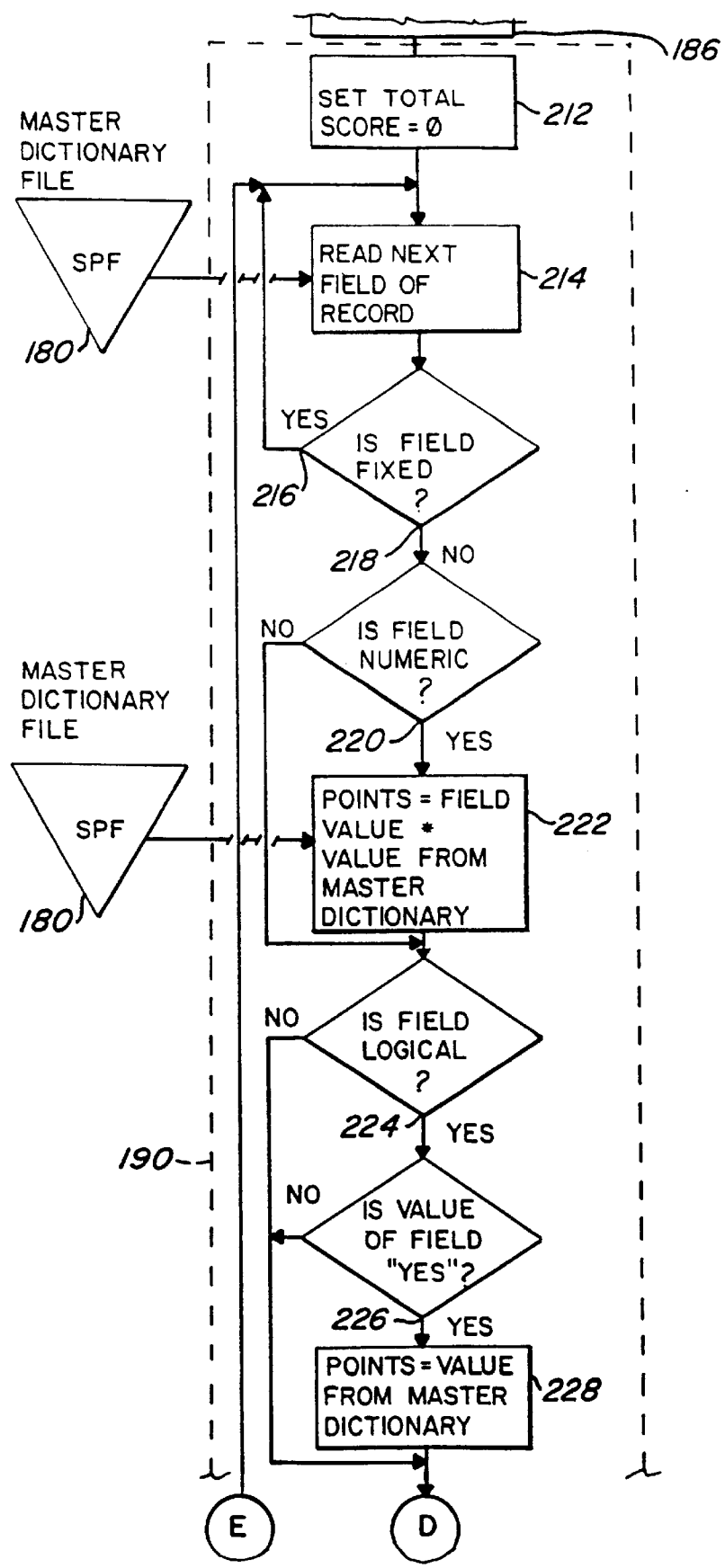
Fig_7A

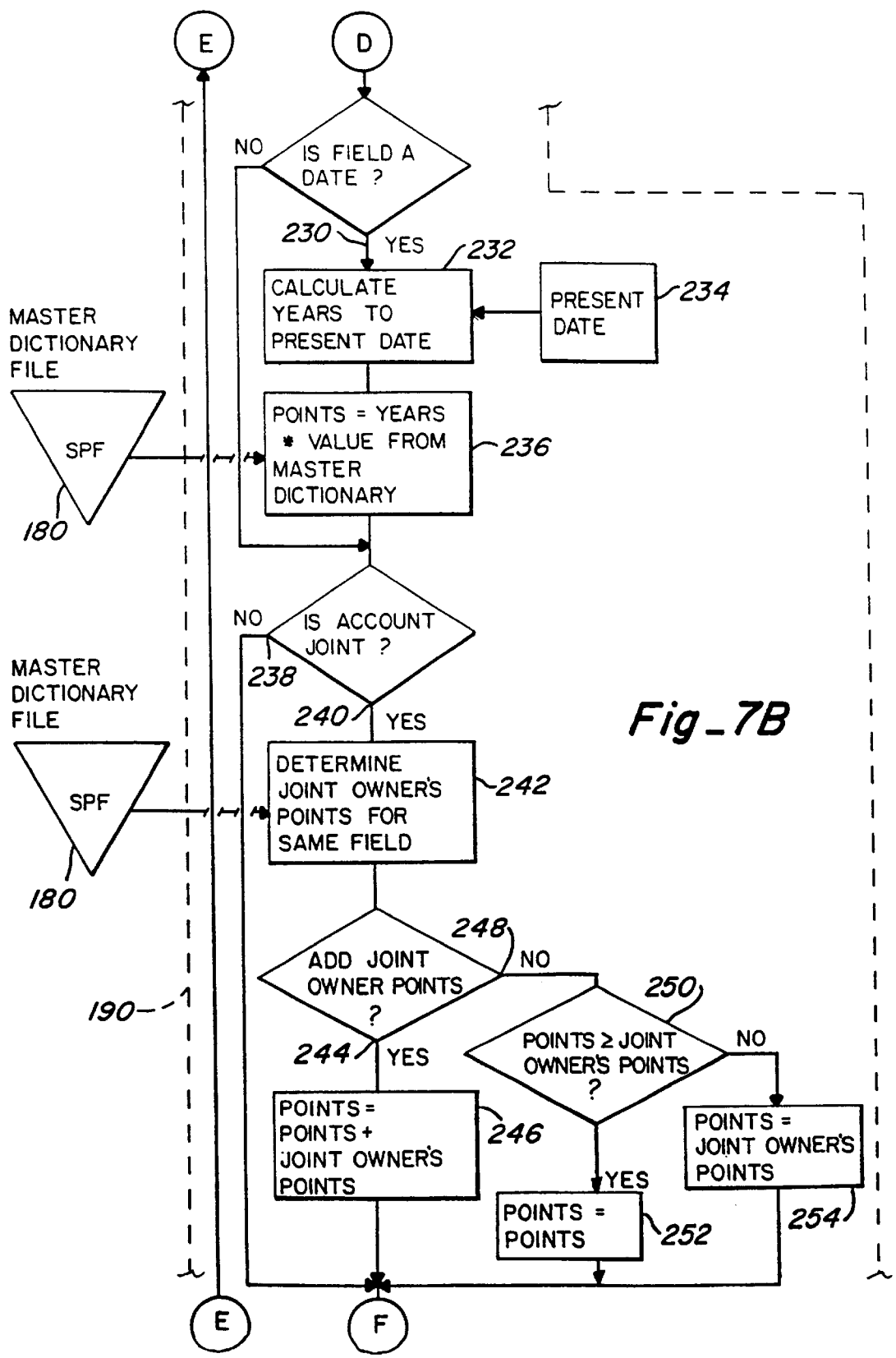
Fig_7B

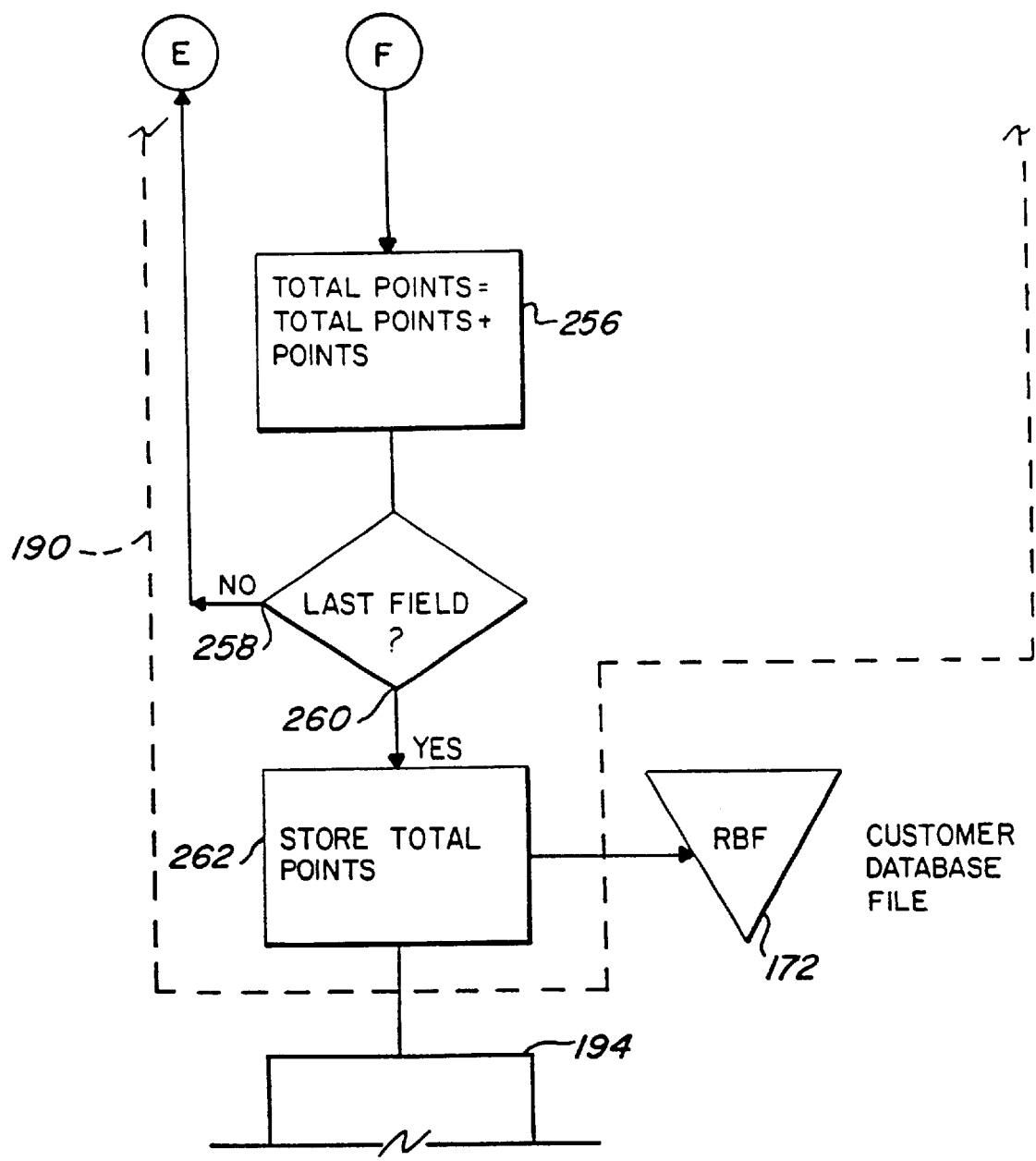
Fig_7C

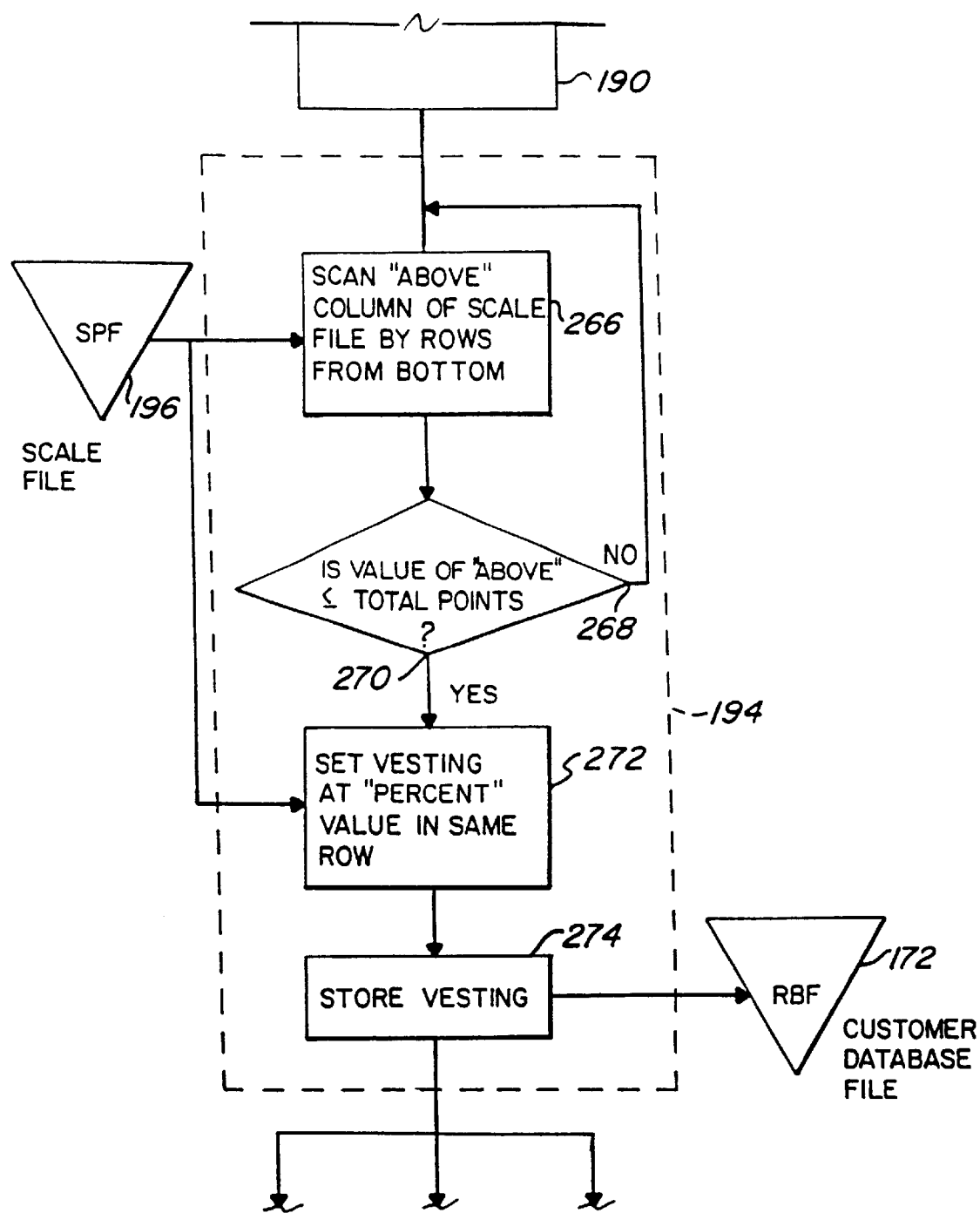
Fig_8

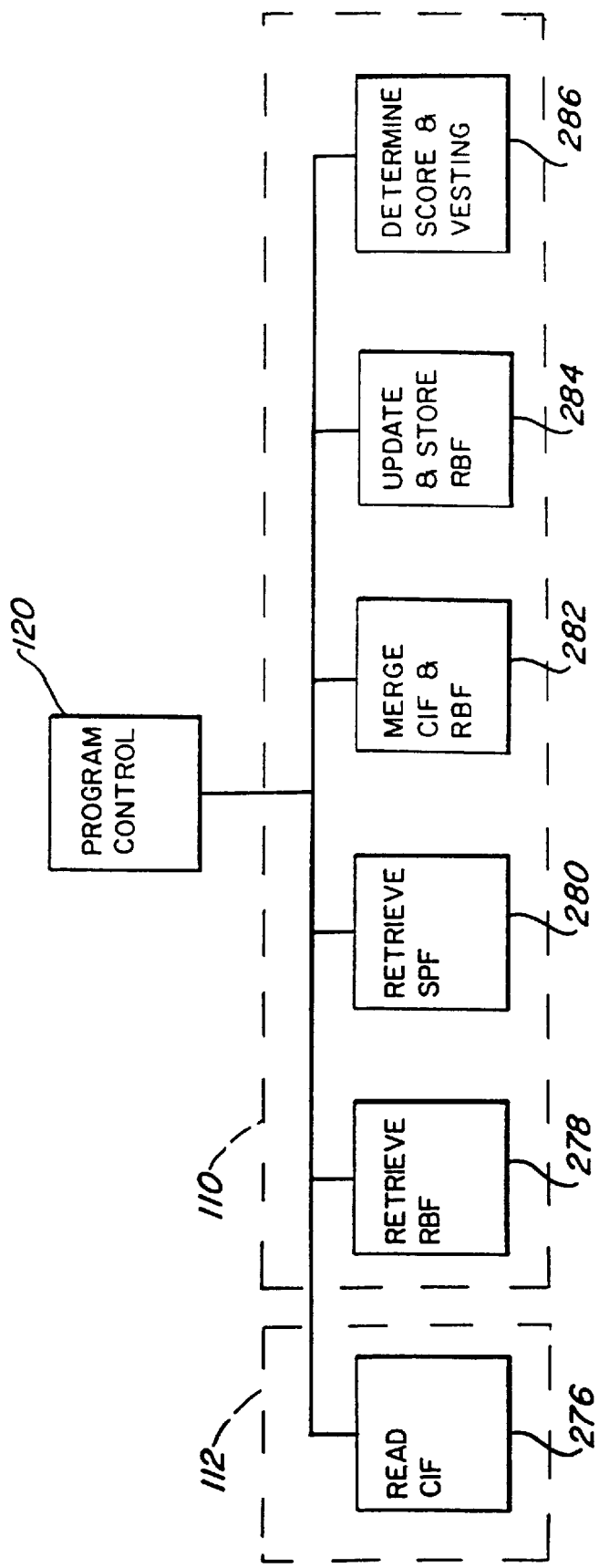
Fig_9

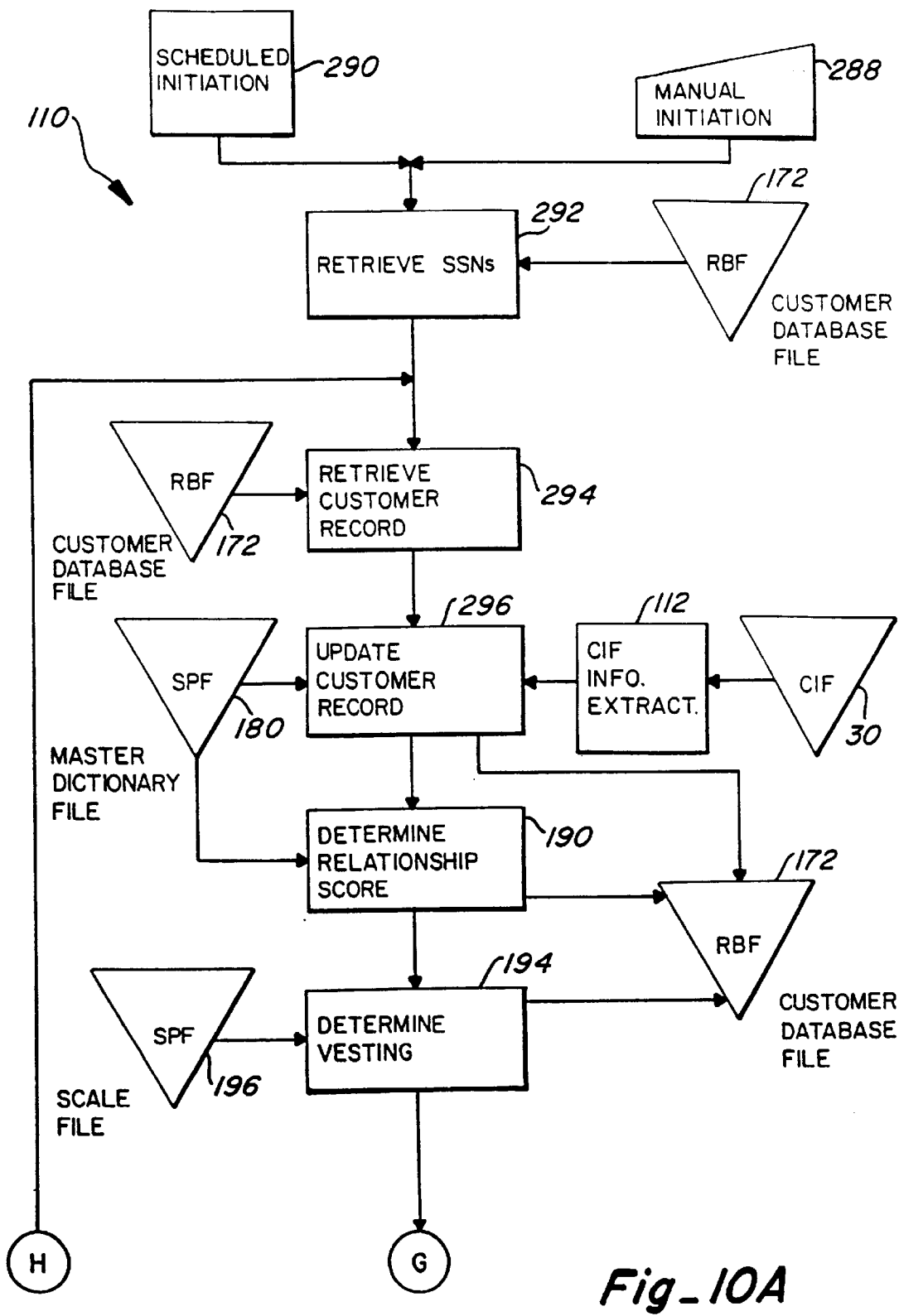
Fig_10A

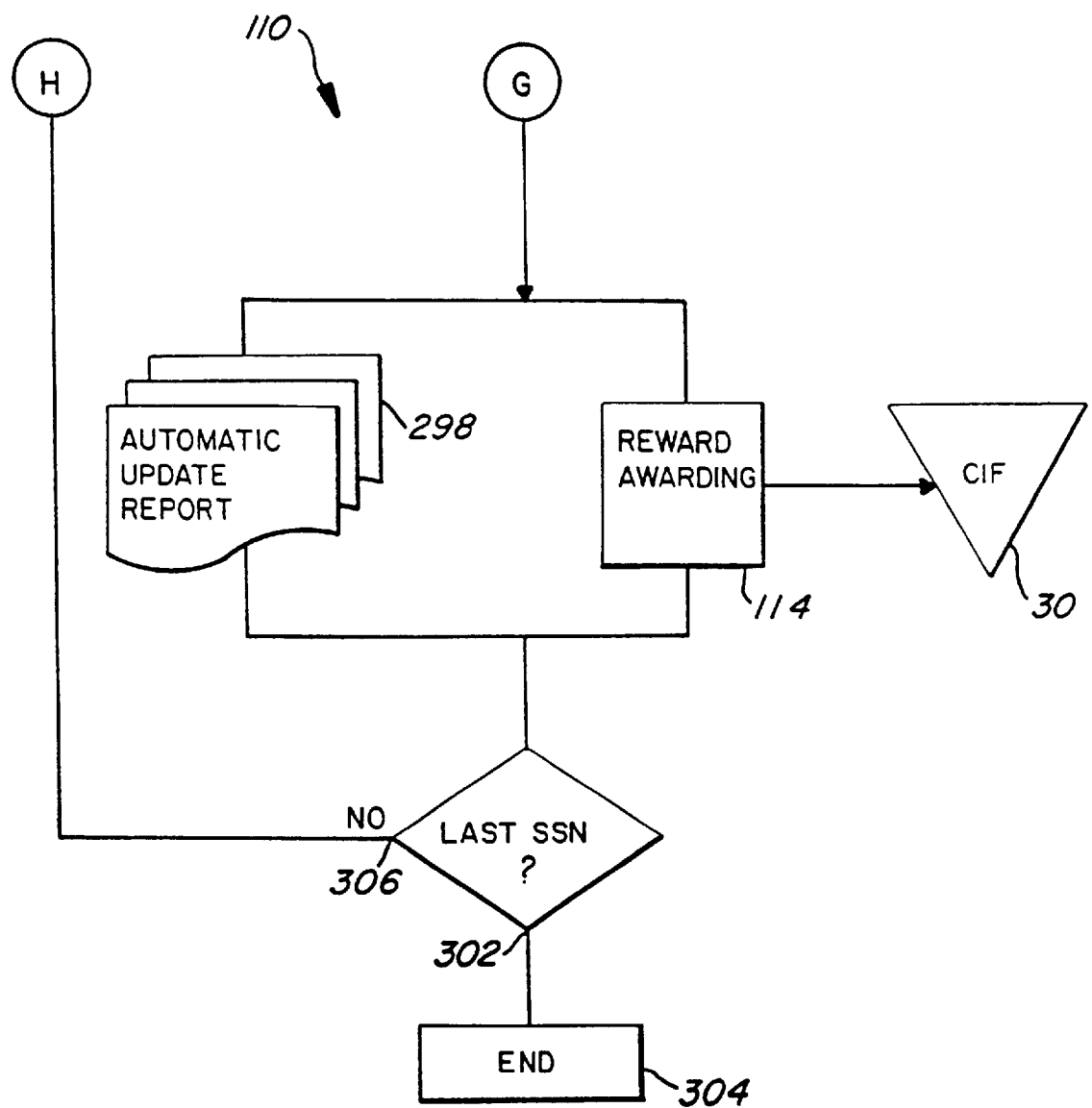
Fig_10B

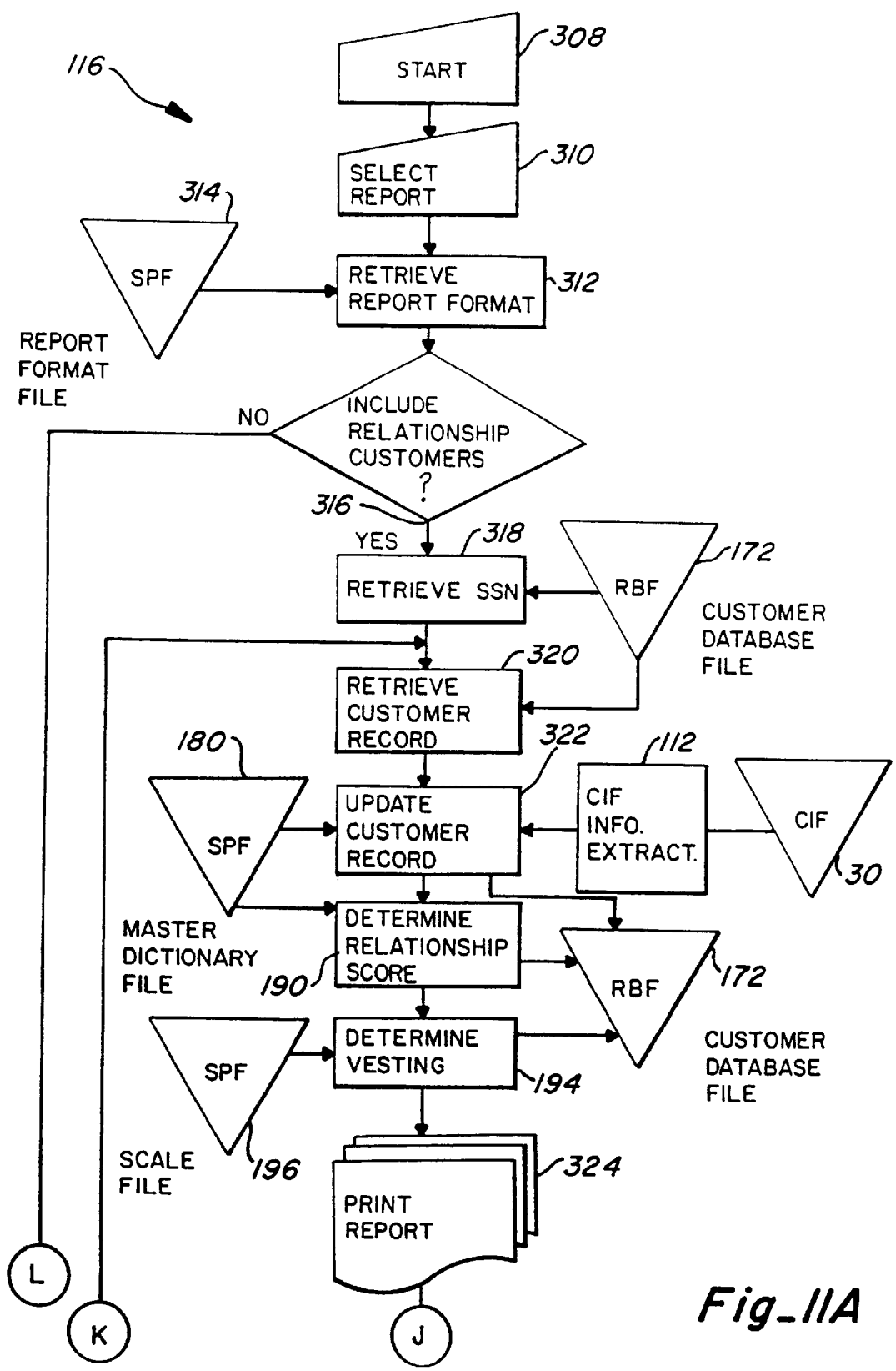
Fig_11A

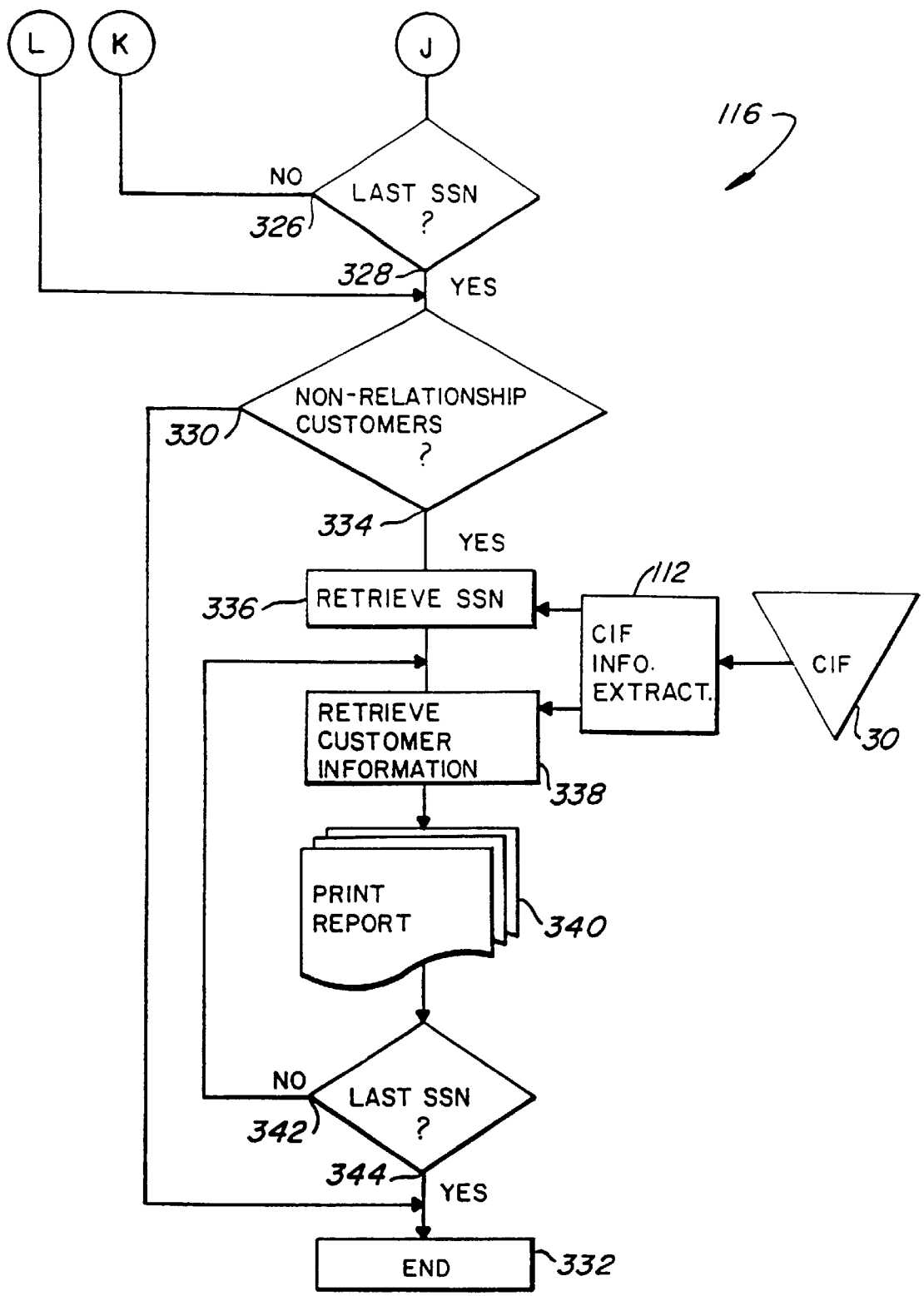
Fig_11B

DATA PROCESSING TECHNIQUE FOR SCORING BANK CUSTOMER RELATIONSHIPS AND AWARDING INCENTIVE REWARDS

This is a continuation application of U.S. patent application Ser. No. 07/808,324 filed Dec. 16, 1991, which is hereby incorporated by reference and from which priority is claimed.

This invention pertains to data processing techniques useful in Banks. More particularly this invention pertains to a data processing technique for determining the number of different Relationships that a customer has with the Bank, scoring the Relationships and awarding Incentive Rewards based on the Relationship score. As used herein the term "Bank" is intended to mean all types of financial service institutions, including banks, savings and loan associations, credit unions and the like, which offer a variety of financial and investment services to customers; the term "Relationship" is intended to mean each type of financial transaction, account or interaction which the customer may establish with the Bank, such as a checking account, savings account, consumer loan, credit card, mortgage, investment, certificate of deposit, insurance policy, new customer referral or the like; and the term "Incentive Reward" is intended to mean some type of consideration or recognition established and given by the Bank to the customer in recognition of the number and characteristics of the customer's Relationships, such as an increased interest rate on deposit accounts, a reduced interest rates on loan accounts, reduced Banking service fees or the like.

BACKGROUND OF THE INVENTION

There is a recognized need in the financial services industry to attract and retain loyal customers. A loyal customer is one who establishes all or a significant number of his Relationships with a single Bank and does so over an extended period of time. This need is particularly important to Banks in small and medium sized communities where regionally and nationally marketed financial services have attracted customers away from the local institutions. This need is also important to Banks in highly competitive markets where customers are offered a wide variety of investment and Relationship options, some of which may individually be very enticing to existing customers of other Banks.

Incentive programs for rewarding repeat or ongoing customers have become increasingly common in a variety of industries. Well known examples of the use of incentives to attract and reward repeated customer patronage are airline frequent flyer programs. In airline frequent flyer programs the customer is awarded points, often expressed in terms of "miles traveled" for each use of a particular airline or its affiliates. Additional points or "miles" are awarded for use of ancillary services such car and hotel room rentals. Other examples of customer incentive programs include the trading stamp programs once popular in the grocery retail trade.

The assignee of the present invention has developed a Bank customer incentive program called the "Loyalty Banking® Program." Under the Loyalty Banking Program a Bank rewards customers who have Relationships with the Bank and who maintain those Relationships for extended periods of time. A portion or all of the Bank's customers may be enrolled or participating in the program. Other customers may not be enrolled in the program. A score card is manually maintained for each customer enrolled in the Loyalty Banking Program. Points are manually calculated based on the information manually entered on the score card, and Incentive Rewards are manually awarded on a periodic basis for the number of Relationships maintained by the customer at the Bank. The point awards may be increased in relation to the length of time the customer maintains the Relationships at the Bank. Based on the points accumulated by the customer as represented by the score on the score card, the customer periodically receives Incentive Rewards.

The implementation of a customer incentive program for Bank customers has complexities not found in customer incentive plans in other industries. The Relationships between the Bank and any customer may be quite numerous and complex, involving a number of different kinds of accounts and interactions. Most other incentive programs require tracking of only one customer factor such as miles travelled in a frequent flyer program or the total dollar volume of purchases in a grocery store trading stamp program.

Implementation of the assignee's manual Loyalty Banking Program is difficult, time consuming and labor intensive. There is always the increased risk of incorrect calculations resulting from human computations. Maintaining a manual Relationship score card on each Bank customer duplicates much of the data available in the computer data bases maintained by most modern Banks.

There can exist a great deal of variation among Banks in the types of financial services offered and emphasized. In particular, different Banks may wish to establish different scoring systems for the various types of Relationships, depending on which Relationships they find to be most profitable. Further, each Bank may wish to establish a different award structure of incentives, depending upon that Bank's perception of the benefits of the program in relation to the costs of the incentives and to the needs of its particular community.

Furthermore, for an incentive program to be fully effective as a tool for attracting and retaining long-term customers, it is desirable for the Bank's management to be able to monitor the Relationships between the Bank and the customers as individuals and in groups. The Bank may thus be able to identify significant opportunities for marketing its financial services by evaluating the Relationships and their appeal to customers.

It is against this background that the present invention has evolved.

SUMMARY OF THE INVENTION

A significant aspect of this invention is a Relationship scoring and Incentive Reward awarding process useful with a Bank customer incentive program to reduce the labor required by a manual Bank customer incentive program. In accordance with this aspect of the invention the Relationship scoring and Reward awarding process assembles data representing the Relationships between the Bank and its customers and automatically determines the Relationship score for each customer from the assembled data. The Relationship score may be based on the number, type and duration of the Relationships. Also in accordance with this aspect of the invention Incentive Rewards are awarded to each customer based on the automatically determined Relationship score. Further in accordance with this aspect of the invention the Relationship score to be awarded for the type and duration of each Relationship may be established or changed to meet the requirements of the Bank.

Another significant aspect of this invention is a Relationship scoring and Incentive Reward awarding process that automatically obtains information about customers' Relationships with the Bank directly from the Bank's computer data base, or customer information file, that is maintained by the Bank for its day-to-day data processing operations. By obtaining the data directly from the customer information file, the labor required compared to a manual Bank customer incentive program is further reduced and human errors in transferring data are virtually eliminated. In accordance with this aspect of the invention information representing customer Relationship is automatically extracted from the customer information file. The extracted information is automatically used by the Relationship scoring and Incentive Reward awarding process in determining the Relationship score of each customer.

Still another significant aspect of this invention is a Relationship scoring and Incentive Reward awarding process that automatically determines a customer's entitlement to the Incentive Rewards. In accordance with this aspect of the invention a vesting relationship or percentage is automatically determined from the Relationship score and the Incentive Rewards are awarded accordingly. Also in accordance with this aspect of the invention the Incentive Rewards may be automatically awarded to the customer by adjusting information in the customer information file. Examples of information that may be adjusted to award Incentive Rewards are loan and deposit account interest rates and bank service fees. Further in accordance with this aspect of the invention, the relationship between Relationship score and the vesting of Incentive Rewards may be established or changed to meet the requirements of the Bank.

A further significant aspect of this invention is a Relationship scoring and Incentive Reward awarding process that prepares written reports to convey marketing information to the Bank's management. In accordance with this aspect of the invention the information concerning the Relationships between the Bank and its customers is organized and written reports presenting the information regarding the nature of the process itself is presented in a format specified by the Bank's management.

BRIEF DESCRIPTION OF THE DRAWINGS

FIGS. 6A, 6B and 6C form a single flow chart diagram of the steps involved in executing the manual updating state of the process, as shown in FIGS. 4 and 5.

FIGS. 7A, 7B and 7C form a single flow chart diagram of the step of determining a Relationship score shown in FIG. 6B.

FIG. 8 is a flow chart diagram of the steps of determining customer vesting in Incentive Rewards shown in FIG. 6B.

FIG. 9 is a chart of the procedures executed during an automatic updating state of the process shown in FIG. 4.

FIGS. 10A and 10B form a single flow chart diagram of the steps involved in executing the procedures shown in FIG. 9.

FIGS. 11A and 11B form a single flow chart diagram of the steps involved in executing the procedures of a report generating state of the process shown in FIG. 4.

DETAILED DESCRIPTION

Figure 1:
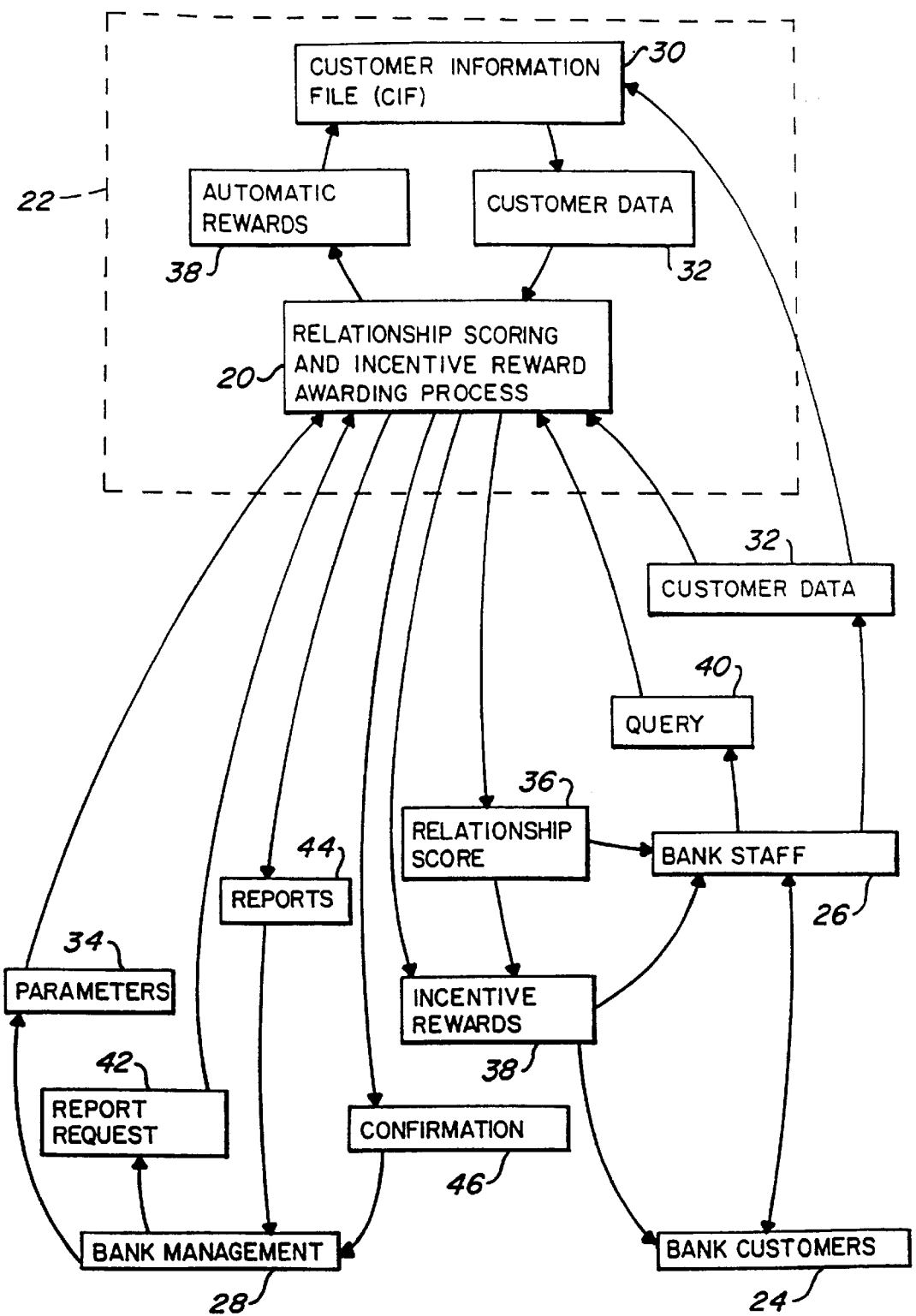
FIG. 1 is a diagram showing the flow, sources and types of information, and the types of human and mechanical interaction and execution, involved a process for scoring Bank customer Relationships and awarding Incentive Rewards using a computer, in accordance with the present invention.

The general nature of a process 20 for scoring Bank customer Relationships and awarding Incentive Rewards according to the present invention, hereinafter referred to as a Relationship scoring and Incentive Reward awarding process, is illustrated in FIG. 1. The Relationship scoring and Incentive Reward awarding process 20 is defined and executed by software programming instructions operating a conventional digital computer 22 of the Bank. The sources of information used to execute the Relationship scoring and Incentive Reward awarding process 20 are Bank customers 24, which communicate with the process 20 through the members of the staff 26 of the Bank, the members of the management 28 of the Bank, and a customer information file (CIF) 30 which is resident in memory of the computer 22.

The CIF 30 is one or more computer databases that contain the information used by the computer 22 of the Bank for its day-to-day data processing operations. The CIF 30 is typically created by a Bank operations software program (not shown) that is external to the Relationship scoring and Incentive Reward awarding process 20, and which operates on the Bank's computer 22. The CIF 30 contains customer data 32 describing each of the customers 24 of the Bank. The customer data 32 in the CIF 30 typically includes the name, address and social security number of each customer 24, and an identification of and information concerning each Relationship the customer 24 has established with the Bank. Customer data 32 from the CIF 30 is supplied by the computer 22 as needed to execute the process 20. When a new customer 24 establishes a Relationship, or an existing customer 24 establishes a new Relationship or changes a Relationship, the customer data 32 necessary to establish or change the Relationship is supplied to the process 20 and the CIF 30 by the Bank staff 26 . In this case, the customer 24 supplies the information to the staff 26 and the staff interacts with the process 20 and the CIF 30 to enter this new or changed data 32.

In general the customer data 32 supplied to the process includes data that is furnished by the customer 24 for use in the process 20 and data that is furnished by the CIF 30 for use in the process 20. The CIF 30 typically contains information that is not relevant to the process 20 which is used in the other day-to-day data processing functions of the Bank, in addition to relevant information supplied to and used in performing the process 20 which is typically only the customer data 32. Furthermore, the CIF 30 may not contain all of the customer data 32 relevant to performing the process 20, in which case the relevant customer data 32 not contained in the CIF 30 must be obtained directly from the customer 24 and supplied to the process 20 by way of the Bank staff 26 . In cases where not all of the Bank's customers are enrolled or participating in the program accomplished by the process 20, the customer 24 must additionally supply, through the staff 26, the customer data 32 needed to begin the customer's participation or enrollment in the program.

The management 28 of the Bank also establishes definitional and operational information for the process 20, referred to as parameters 34. The parameters 34 control the Relationship scoring and Incentive Reward awarding process 20. Parameters include such matters as point values to be awarded to each Relationship, the types of Relationships which are to be counted in the process 20, the relationship between the points obtained by a customer and the Relationship score of the customer, the relationship between the Relationship score and the Incentive Rewards awarded, and the extent or degree and type of certain types of the Incentive Rewards such as adjusted interest or loan rates or service charges.

In executing the process 20, each Relationship between a customer and the Bank is assigned a point value, established by the parameters 34, that depends upon the type and in some cases the duration of the Relationship or the duration of customer's oldest Relationship with the Bank. The point values for all of the eligible Relationships of each customer are added together to calculate a Relationship score 36 for that customer 24. The Relationship score 36 is used to determine the customer's entitlement to, or vesting in, various customer Incentive Rewards 38. The Incentive Reward 38 is communicated directly to the customer 24, such as in the exemplary case of a certificate of entitlement mailed to the customer, or the Incentive Reward 38 is automatically communicated to the CIF 30 for the benefit of the customer, such as in the exemplary case of an increased interest rate on a deposit account or a reduced interest rate on a loan account.

The Relationship score 36 and the Incentive Rewards 38 are also directly communicated directly to the staff 26 in response to a query 40 which either the staff 26 or the customer 24 through the staff 26 may generate. In this manner, the staff 26 may inform the customer 24 of the Incentive Rewards 38 which the customer has received. Depending on whether the management 28 has made a policy decision concerning whether or not the customer 24 is to receive information concerning the Relationship score 36, the staff may also inform the customer of the Relationship score. A query 40 may also initiate other procedures available from the process 20.

The management 28 can also request various types of reports concerning the operation of the process by generating a report request 42, in response to which a report 44 will be supplied. The type and format of the report 44 is established by the parameters 34 which have been previously set by management 28. The reports 44 contain information about the customers 24 and are used to monitor the Relationships between the Bank and its customers and to identify marketing opportunities. In both cases of setting parameters 34 and sending a report request 42, a confirmation 46 of the requested activity and its acknowledgement is-provided to management.

The computer 22 is typically a conventional mainframe digital computer located on the premises of the Bank, although it may be a minicomputer or microcomputer. The CIF 30 is maintained by the Bank operations software programs (not shown) operating the computer 22. The computer 22 takes a variety of different configurations, all utilizing conventional components. Two examples of different but typical configurations are shown in FIGS. 2 and 3.

Figure 2:
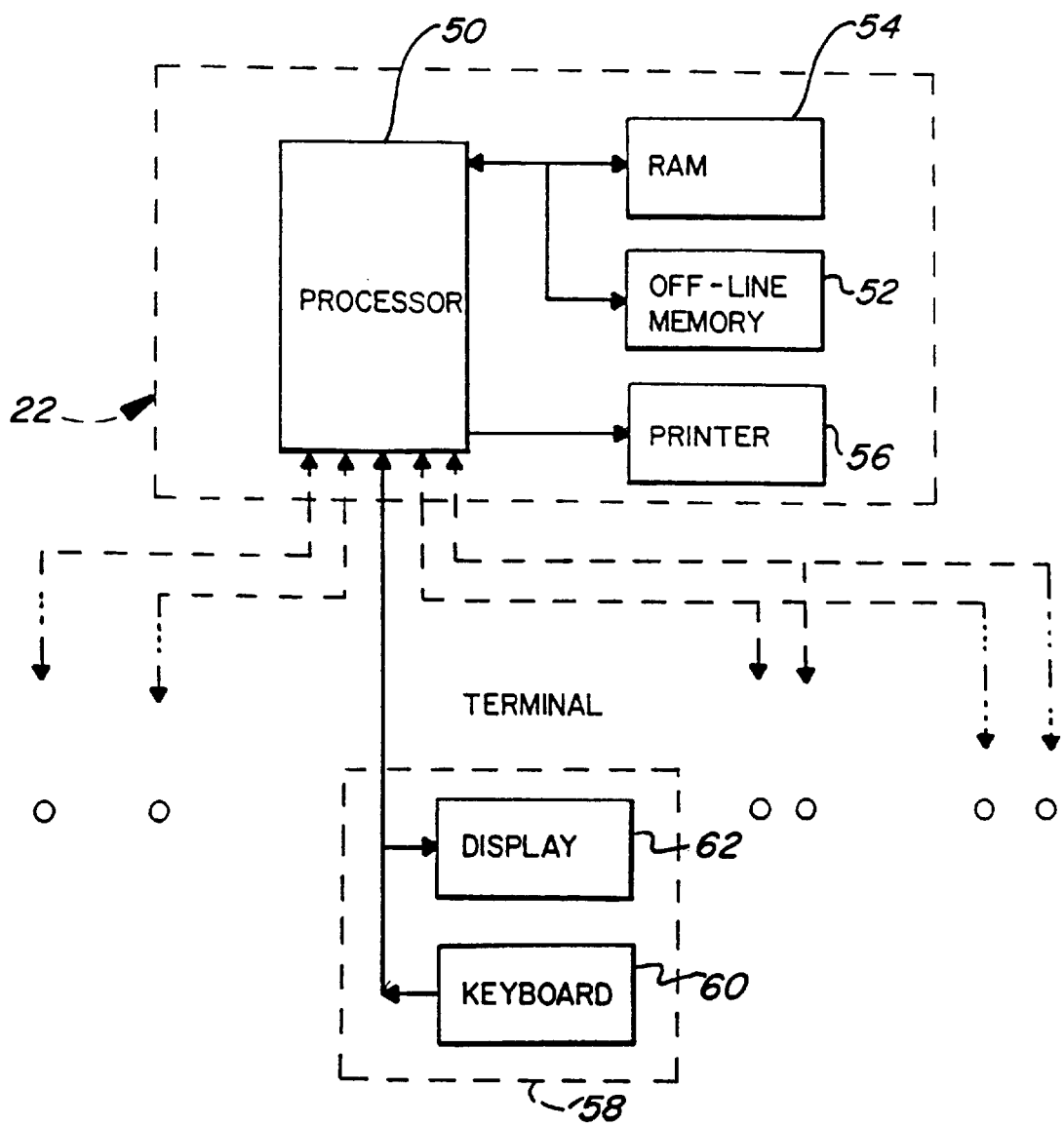
FIG. 2 is a block diagram of one example of the computer shown in FIG. 1.

In the example of the configuration of the computer 22 shown in FIG. 2, a single digital computer for the Bank includes a processor 50 which performs the Relationship scoring and Incentive Reward rewarding process 20 (FIG. 1) on a shared basis with the other typical Bank data processing functions such as are executed by the Bank operations software program. The CIF 30 (FIG. 1) resides in an off-line memory 52. The off-line memory 52 may be any form of non-volatile data storage, such as magnetic disc or tape memories. operating instructions and data files which execute the Relationship scoring and Incentive Reward awarding process 20 (FIG. 1) also reside in the off-line memory 52. The processor 50 retrieves the operating instructions and CIF data from the off-line memory 52 to perform the Relationship scoring and Incentive Reward awarding process 20 (FIG. 1). A random access memory (RAM) 54 stores data and operating instructions in a form readily available to the processor 50 while the computer 22 is performing the Relationship scoring and Incentive Reward awarding process 20 (FIG. 1). A printer 56 receives information from the processor 50 and prepares the written reports 44 (FIG. 1). At least one but typically a plurality of terminals 58 are connected to the computer 22 by which to communicate information from a keyboard 60 and by which to receive information at a visual display 62.

Figure 3:
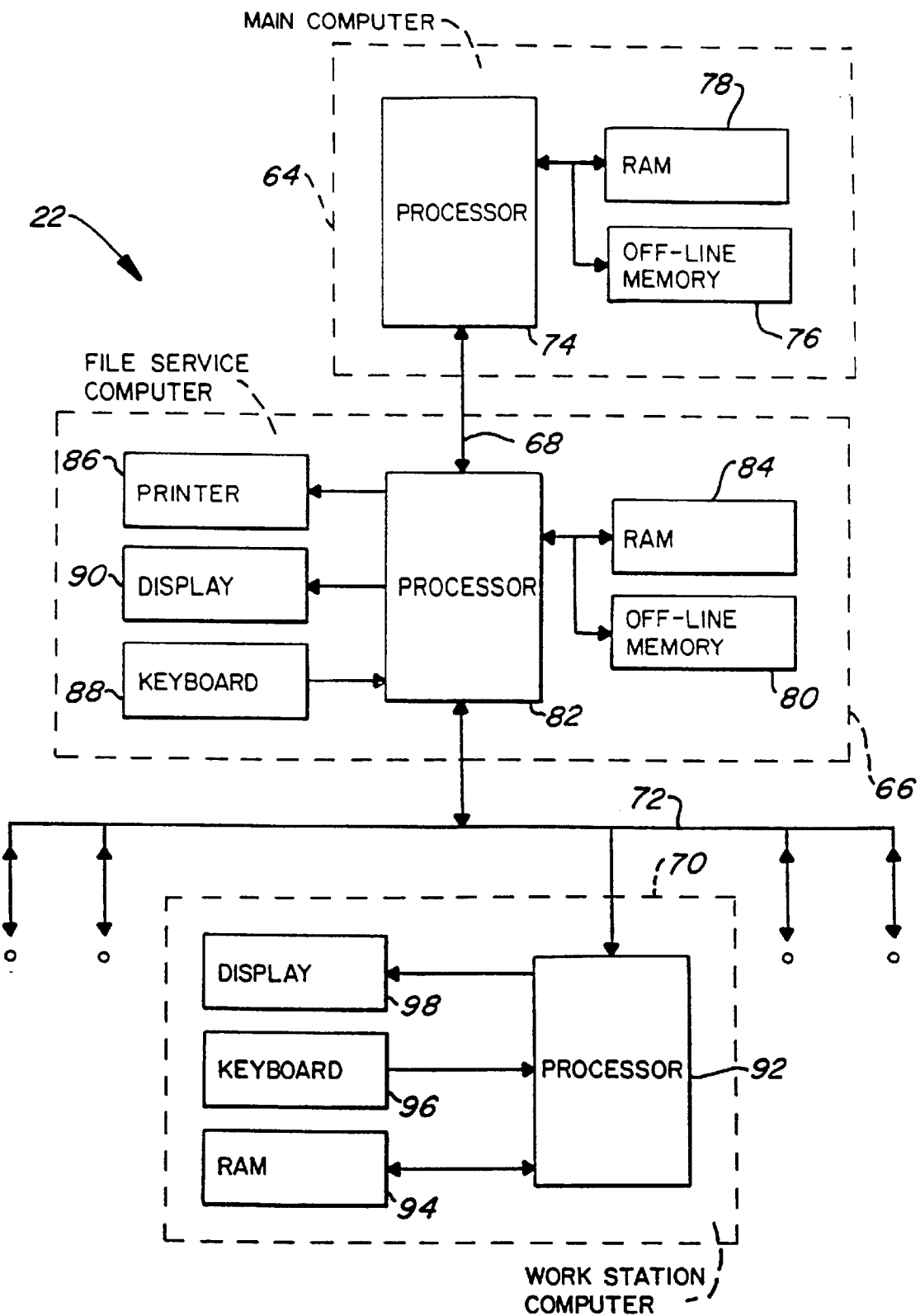
FIG. 3 is a block diagram of another example of the computer shown in FIG. 1.

Another example of a typical configuration of the computer 22 is shown in FIG. 3. In this example, the computer 22 comprises a main or central computer 64, typically a mainframe computer, communicating with a microcomputer file server computer 66 over a data link 68. The file server computer 66 may be connected to one or more microcomputer work stations 70 by individual connections or by a local area network 72. The Relationship scoring and Incentive Reward awarding process 20 (FIG. 1) is performed primarily by the file server computer 66 and the work stations 70 acting in concert with the main computer 64.

The main computer 64 includes a processor 74 to which an off-line memory 76 and a RAM 78 are connected. The main computer 64 performs the typical Bank data processing functions and supplies CIF 30 (FIG. 1) information to the file server computer 66. The CIF information resides most of the time in the off-line memory 76, but occasionally in RAM 78, when the main computer 64 is performing Bank data processing functions. When the file server computer 66 calls for the CIF information, the processor 74 extracts the CIF information from memory 76 or 78 and supplies that information over the data link 68 to the file server computer 66.

The file server computer 66 incorporates an off-line memory 80 in which the operating instructions for the Relationship scoring and Incentive Reward awarding process 20 (FIG. 1) and the data pertinent to the parameters 34 (FIG. 1) typically reside. A processor 82 of the file server computer 66 controls the execution of the Relationship scoring and Incentive Reward awarding process 20 (FIG. 1) by transferring the operating instructions and data from the off-line memory 80 to a RAM 84 and executing the instructions utilizing the data supplied to it from the RAM 84, the main computer 64 and the work station 70. A printer 86 produces written reports 44 (FIG. 1) under the control of the processor 82. The file server computer 66 may also permit the manual entry of data and commands such as through a keyboard 88, and may also permit the visual display of information available at the file server computer 66 on a visual display 90.

Each work station 70 comprises a processor 92 to which part or all of the computational processes and data of the Relationship scoring and Incentive Reward awarding process 20 (FIG. 1) are downloaded for execution. The operating instructions and data from the memories 80 or 84 of the file server computer 66 are communicated over the local area network 72 and are stored in a RAM 94 or other suitable memory to be readily usable by the processor 92. Significant aspects or all of the Relationship scoring and Incentive Reward awarding process 20 (FIG. 1) can then executed by the work station 70. Data and commands may be supplied to the processor 92 from a keyboard 96. A visual display 98 displays information available at the work station 70. After the computational aspects of the process 20 are completed, the resulting data is uploaded to the file server computer 66 over the local area network 88. Information necessary to update the CIF in the memory 76 or 78 of the main computer 64 is then transferred from the file server computer 66 to the main computer 64 through the data link 68.

Figure 4:
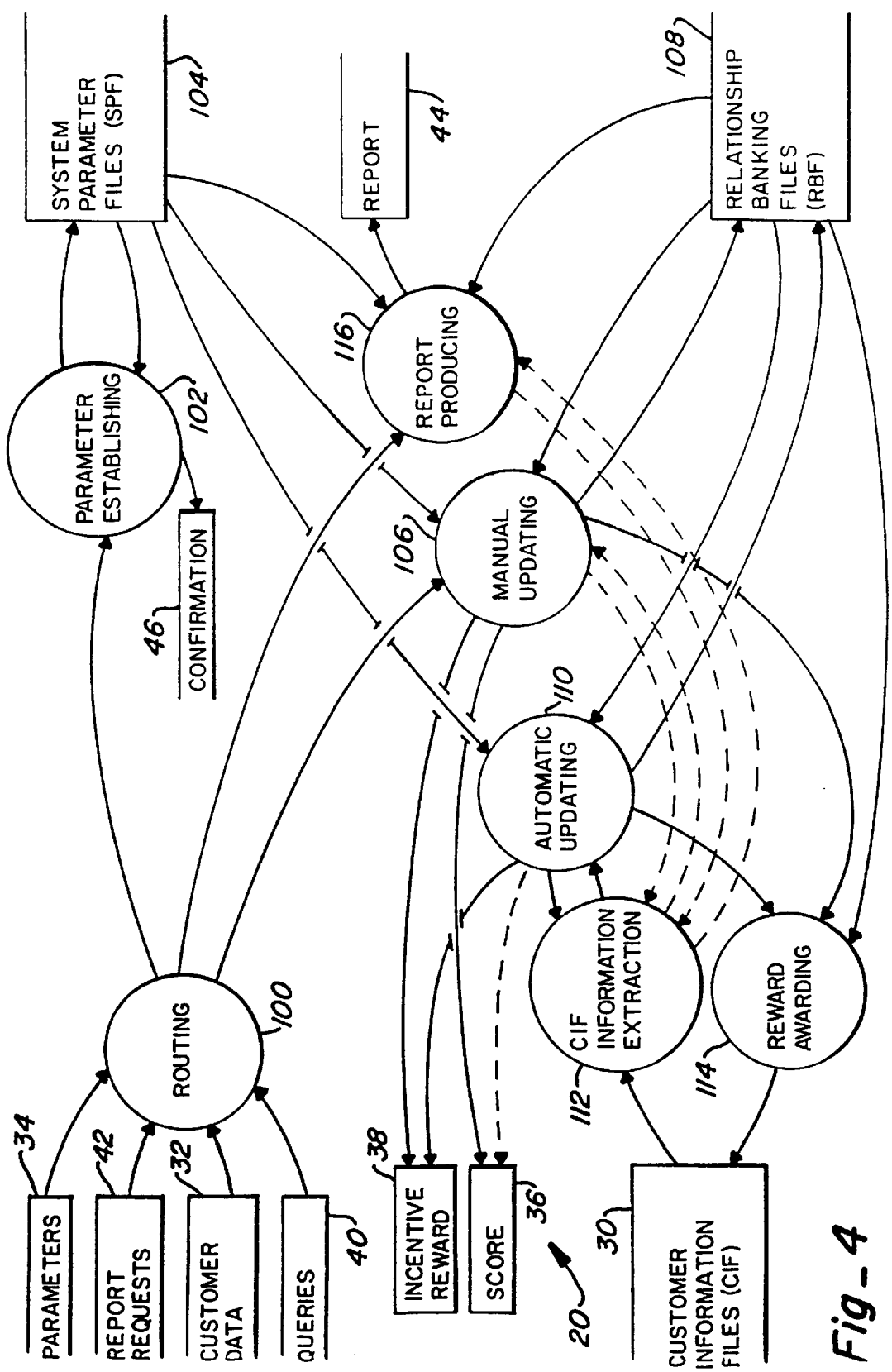
FIG. 4 is a state transition diagram illustrating states during execution of the process illustrated in FIG. 1.

The functionality of the Relationship scoring and Incentive Reward awarding process 20 is generally illustrated by the state transition diagram shown in FIG. 4. The various states of execution of the process 20 and the transitions between the states occur from and in relation to the actions and information previously described in conjunction with FIG. 1.

The transitions to and between the different states of execution of the process 20 may be manually initiated in response to the input of customer data 32 or of a query 40 from customers and staff, to setting new or changed parameters 34, or to generating a report request 42. A routing state 100 of the process 20 interprets this input information 32, 34, 40 and 42, and causes a transition to one of the other states in accordance with the type of input information.

A parameter establishing state 102 is entered in response to management setting a new or changed parameter 34. In the parameter establishing state 102, certain system parameter files (SPF) 104 are built or established to accept the new and changed parameters set by management. A data table building procedure included in the process 20 creates the SPF 104 in memory of the computer 22 (FIG. 1). Upon completing the SPF 104 or changes to it, the confirmation 46 is issued to confirm that the SPF 104 has been built or changed according to the parameters 34.

The SPF 104 is a group of data files which define and organize the operation of the process 20, including the way in which the customer data 32 is received, stored and used by the process 20. The SPF 104 further define the manner in which the Relationship scores and the award of Incentive Rewards 38 are determined from the customer data 32. The files of the SPF 104 include a master dictionary file, a scale file and a report format file. The master dictionary file contains parameters to define and organize the various elements of customer data 32 (FIG. 1) pertinent to the execution of the process 20. The master dictionary file also defines parameters to be used in determining the Relationship score. The scale file contains information defining the degree to which a customer is entitled to be awarded an Incentive Reward. The report format file contains the information required to organize the customer information for written reports and to prepare the reports.

A transition to a manual updating state 106 is initiated by the routing state 100 in response to new customer data 32 or a query 40 about a customer's Relationship score or vesting. The manual updating state 106 is the state of the process in which customer data 32 about customers that are initially enrolling in the program is supplied, such as data required to locate the corresponding customer data 32 in the CIF. The manual updating state 106 also permits manually entering any customer data 32 that is not available from the CIF 30, changing customer data 32, performing a query about the customer's Relationship score 36 or Incentive Rewards 38, or removing the customer data 32 of a customer who is no longer enrolled in the program. The manual updating state 106 includes a data file building procedure that creates or updates a plurality of Relationship banking files (RBF) 108. The RBF 108 are created the first time the process 20 transitions to one of the manual updating state 106 or an automatic updating state 110.

The RBF 108 are the principal informational files of the process 20 and provide the relevant customer data 32 received from the CIF 30 and the customers 24 about customer's Relationships with the Bank. The customer data 32 in the RBF 108 is employed in the procedures executed in the states of the process 20 in accordance with the definitional and organizational information in the SPF 104 to permit the procedures in the process states to determine Relationship score. The RBF 108 contains individual datafiles in which the customer data 32 about customers and their Relationships with the Bank is stored for use in generating the Relationship score 36 and in producing the management reports 44. A customer database file containing a record for each customer is contained in the RBF 108. Each record contains a plurality of fields, and each of the fields contains information about the customer and the customer's Relationships with the Bank. The information in the customer database file of the RBF 108 is established in an organizational and definitional form determined by the master dictionary file of the SPF 104. The RBF 108 may also contain one or more cross reference files to facilitate locating the record of a particular customer.

In the manual updating state 106, information about the customer is retrieved from the customer database file of the RBF 108. After retrieval of the information, the Relationship score 36 of the customer is computed by reference to the master dictionary file retrieved from the SPF 104. The scale file of the SPF 104 is retrieved and used to determine the customer's vesting or award of Incentive Rewards 38 based on the customer's Relationship score 36.

After retrieval, the information in the customer database file of the RBF 108 may be modified in accordance with new or changed customer data 32. The cross reference files of the RBF 108 may also be retrieved and updated in accordance with newly supplied customer data 32. Prior to completion of execution of the manual updating state 106, the modified customer database file and cross reference files are stored to update the RBF 108.

Information from the CIF 30 may be used in building or manually updating 106 the customer database file of the RBF 108, if such information is present in the CIF. In such circumstances a transition from the manual updating state 106 to a CIF information extracting state 112 occurs. The CIF information extracting state 112 obtains the information from the CIF 30 and manipulates its format to make available it for use by the process 20. A transition back to the manual updating state 106 occurs to allow the information extracted by the procedures of the CIF information extracting state 112 to be used in building and updating the information in the customer database file, and possibly other files, of the RBF 108.

Several Bank operations software programs are commercially available for creating and maintaining the CIF 30. Many of the available Bank operations software programs have customizing options which allow the Bank to tailor the Bank operations software program and the CIF 30 to its own needs. Because of this variability, it is typical for the file retrieval and format manipulating procedures of the CIF information extracting state 112 to be unique to each Bank.

The procedures of the automatic updating state 110 are executed on a regular periodic basis, typically in response to a timed initiation inherent within the automatic updating state 110. In the automatic updating state 108, procedures are executed which routinely update the customer data in the RBF 108 in accordance with the customer data 32 in the CIF 30. The procedures executed, and the results obtained from execution of the automatic updating state 110 are essentially similar to those obtained from executing the manual updating state 106. Executing the procedures of the automatic updating state 110 of the process 20 updates the RBF 108 based only on information in the CIF 30 and the RBF 108 and the SPF 104, and not in response to new or changed customer data 32 or a query 40, which initiate the execution of the manual updating state 106.

An automatic reward awarding state 114 may be entered from the manual updating state 106 or the automatic updating state 110. The procedures in the reward awarding state 114 extract the Relationship score 36 and the scoring or vesting information from the RBF 108 and adjust the information in the CIF 30 to automatically credit any of the customer's Relationships or accounts with the Incentive Rewards earned by the customer and which are applicable to the specific Relationships. For example, the CIF 30 may be automatically adjusted to decrease account service fees or increase account interest, based on the award of an Incentive Reward of this type applicable to the customer's Relationships.

To generate a report 44, a report producing state 116 of the process 20 is entered and the procedures associated with this state are executed. Reports 44 are generated in response to a report request 42 which is recognized by the routing state 100 to cause a transition to the report producing state 116. In the report producing state 116 the master dictionary file and the report format file of the SPF 104 and the customer database file of the RBF 108 are retrieved. The report request 42 includes a selection of one of the report formats which is available from the report format file and the report request also specifies the type of information to be included in the report 44. The specified information from these files is obtained and processed to produce the report 44.

If management has requested information not included in the customer database file of the RBF 108, the report producing state 116 may initiate a transition to the CIF information extracting state 112 to extract information from the CIF 30 to supplement information retrieved from the customer database file of the RBF 108. For example, if not all customers of the bank are enrolled in the Relationship scoring and Incentive Reward awarding process, and the management of the Bank wishes to compare information about enrolled customers and non-enrolled customers, information about non-enrolled customers will be required and may only be present in the CIF 30.

The structure of aspects of the files of the SPF 104 and the RBF 108 are discussed in more detail below. An example of a typical master dictionary file of the SPF 104 is illustrated in Table A.

TABLE A

| Field Name | Field Type | Field Length | Dec. Places | Point | Rela- tion | Add Joint | Fixed |
|---|---|---|---|---|---|---|---|
| Customer Name | C | 25 | 0 | 0 | N | N | Y |
| Deposit Accts | N | 3 | 0 | 1 | Y | N | N |
| Loans | N | 3 | 0 | 2 | Y | Y | N |
| Safe Deposit | L | 1 | 0 | 5 | Y | N | N |
| Years | D | 8 | 0 | 1 | N | N | N |
| SSN | N | 9 | 0 | 0 | N | N | Y |

Table B illustrates an example of a customer database file of the RBF 108, defined in accordance with the master dictionary file of the SPF 104 illustrated in Table A.

TABLE B

| Customer Name | Deposit Accts | Loans | Safe Deposit | Years | Social Security Number |
|---|---|---|---|---|---|
| Anderson | 2 | 1 | Y | 10/11/85 | 123456789 |
| Wilson | 0 | 1 | N | 11/01/75 | 234567891 |
| Jones | 4 | 0 | Y | 01/01/62 | 345678912 |

Tables A and B are exemplary of the information which may be contained in each file, so these Tables are not intended to present a comprehensive compilation of all information that may be available in the files. In Tables A and B, and subsequent tables, the term "row" refers to each horizontal grouping of informational elements illustrated in each Table, and the term "column" refers to each vertical grouping of informational elements illustrated in the Table.

Each row of the master dictionary file (Table A) defines one of the fields of the customer database file of the RBF 108. Each column of the master dictionary file (Table A) defines an attribute of the field defined by the row. Each row of the customer database file (Table B) is a customer record. Each column of the customer database file (Table B) is a separate field. Each customer record in the customer database file (Table B) is formed by the information pertinent to that customer obtained from all of the fields of information in the customer database file as defined by the master dictionary file (Table A). The definition for each customer record is therefore obtained from the master dictionary file.

The row of the master dictionary file (Table A) entitled "Field Name" identifies the type of information presented in a field of the customer data base file (Table B). The examples shown in this column are Customer Name, Deposit Accounts such as savings accounts, Loans, Safe Deposit for safe deposit boxes rented from the Bank by the customer, Years for the date on which the customer first established a Relationship with the Bank used to determine the years of longevity of the Relationship between the customer and the Bank, and SSN for the customer's social security number. The "Field Type" column identifies the character of the of data contained in the field: "C" meaning comment or text information; "N" meaning a numerical value; "L" meaning a logical value such as "yes" or "no"; and "D" meaning a date. The "Field Length" column defines the size, or number of characters, of the field. The "Dec. Places" column defines the number of decimal places allowed for numerical fields, with "0" denoting integer values. The number of points which the Bank management has determined shall be credited for each type of Relationship is defined by the numerical value in the column labeled "Point." The "Relation" column specifies whether the Relationship is one which will be reported as a relationship in management reports, with "Y" denoting "yes" and "N" denoting "no." The "Add Joint" column denotes the method for calculating points for joint accounts, with "Y" denoting a type of account for which the customer's points are additive with a joint owner's points, and "N" denoting an account for which the points are not additive. The "Fixed" column specifies whether a field is to be counted in determining a Relationship score, with "Y" indicating yes and "N" indicating no.

The customer database file exemplified in Table B contains information about three hypothetical customers enrolled to participate in the Relationship scoring and Incentive Reward awarding process 20. In actuality a typical customer database file may contain data about many more customers. The master dictionary file (Table A) "Field Name" column defines the six fields of each customer record as containing information about the name of the customer, the number of deposit accounts the customer has, the number of loan accounts the customer has, whether the customer has a safety deposit box, the date the customer first became a customer of the Bank and the customer's social security number.

An example taken from Tables A and B illustrates the interrelationship between the master dictionary file and the customer database file in calculating the Relationship score. The customer named "Anderson," social security number 123-45-6789, has two deposit account Relationships, one loan Relationship and a safety deposit box Relationship with the Bank. For each deposit Relationship, defined by the master dictionary table "Field Type" column as a numerical value, and by the "Fixed" column to be used in determining the relationship score, Anderson is entitled one point. Similarly Anderson is entitled to two points for each loan Relationship. Anderson is also entitled to five points for having a safety deposit box Relationship based on the information in the "Safe Deposit" field and one point for each year that Anderson has had a Relationship with the Bank, based on the date in the "Years" column. The points for loan Relationships held by Anderson's joint owner, if any, are additive to Anderson's points, but the points for other Relationships of Anderson's joint owner are not additive with Anderson's points.

These fields and information contained in Tables A and B are exemplary. The parameters established in the master dictionary field may define additional or different fields, which will then be present in each customer record of the customer database file. For example, instead of including information about the customer's loans in a single field, several separate fields may be established, such as for car loans, home mortgages and credit card accounts. Similarly, separate fields could be established for checking accounts, pass book savings accounts and certificates of deposit, instead of using the single field "Deposit Accounts." Further, the dates when each type of Relationship is opened or established and the number of other customers which a specific customer may refer to the Bank may constitute additional fields.

An example of a typical scale file of the SPF 104, which is used to establish the relationship between the Relationship score and the degree or vesting of the Incentive Reward awarded, is illustrated in Table C below.

TABLE C

| Above | Percent |
|---|---|
| 10 | 15 |
| 25 | 30 |
| 40 | 75 |
| 60 | 100 |

In the example of Table C, the number of points in the customer's Relationship score is compared to the point values in the column marked "Above." The row in Table C is identified in which contains the greatest number in the "Above" column that is exceeded by the customer's Relationship score. The customer is awarded that percentage of the Incentive Reward indicated in the column marked "Percent" that is present in this same row. By using the vesting or scoring concept represented by Table C, Incentive Rewards such as a percentage point increase in a deposit account or a percentage point decrease in a loan rate may be partially awarded. Of course, other types of Incentive Rewards may not admit to being divided, and in which case the vesting or scoring concept would simply be a selected limit of points which the Relationship score would have to exceed to entitle the customer to receive the non-divisible Incentive Reward.

Figure 5:
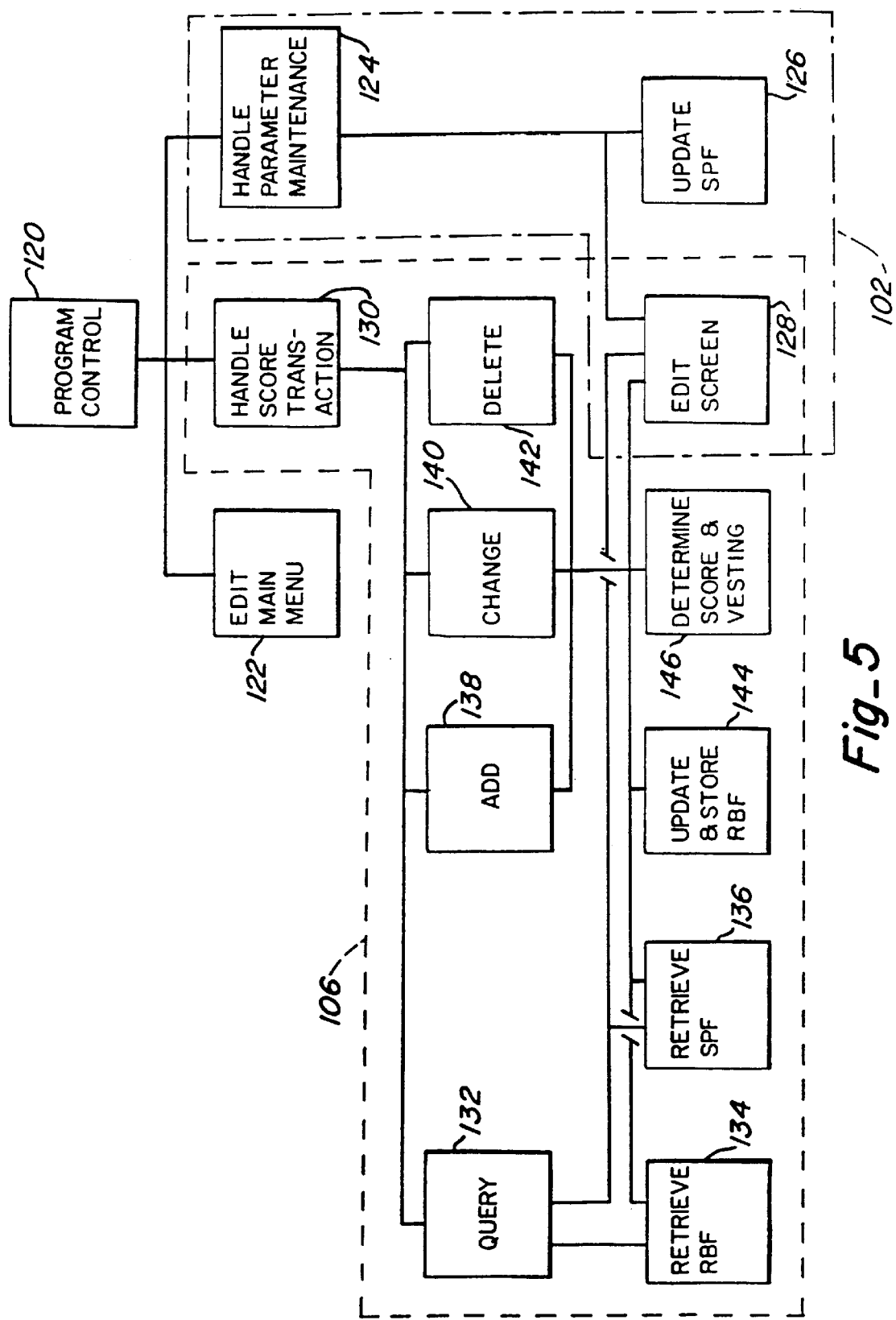
FIG. 5 is a chart of the procedures executed during a manual updating state and a parameter establishing state of the process shown in FIG. 4.

The procedures executed during the manual updating state 106 and the parameter establishing state 102 of the Relationship scoring and Incentive Reward awarding process 20 shown in FIG. 4 are generally illustrated by the procedures chart illustrated in FIG. 5. As shown in FIG. 5, a conventional program control procedure 120 and a conventional edit main menu procedure 122 establish an environment in the computer 22 (FIG. 1) in which the Relationship scoring and Incentive Reward awarding process 20 (FIG. 4) operates. The parameter establishing state 102 involves the execution of a conventional data table building procedure comprising a parameter maintenance handling procedure 124 which receives the parameter information and a SPF updating procedure 126 which updates the SPF 104 (FIG. 4) in response to the parameter maintenance handling procedure 124. The parameter establishing state 102 also includes a conventional screen data editing procedure 128 to create and revise information displayed on a visual display screen.

One procedure executed in the manual updating state 102 is a score transaction handling procedure 130 which receives information and identifies the type of transaction to be performed. The possible transactions include a query about the score or vesting of a particular customer or group of customers, adding a customer record to the customer database file, changing information in a record of the customer database file, and deleting a customer's record from the customer database.

A query procedure 132 activates a RBF retrieving procedure 134 which retrieves information from the RBF 108 (FIG. 4) and further activates a SPF retrieving procedure 136 which retrieves information from the SPF 104 (FIG. 4). Based on the information retrieved the screen data editing procedure 128 displays current information regarding the customer's Relationship score and vesting in the Incentive Rewards.

Each one of an add procedure 138, a change procedure 140 and a delete procedure 142 activates the RBF retrieving procedure 134 and the SPF retrieving procedure 136. The information retrieved is modified by a RBF updating and storing procedure 144 in accordance with the information received to add a new customer database record, delete an existing customer database record or change information in an existing customer database record. The customer's Relationship score and vesting are then determined by a score determining and vesting procedure 146. The new or updated information, or confirmation of a delete transaction, is then displayed by the screen editing procedure 128.

Steps involved in the execution of the procedures occurring during the manual updating state 106 are shown in the flow chart of FIGS. 6A, 6B and 6C. The execution of the procedures of the manual updating state 106 is started 150 manually by a member of the Bank staff who enters customer data 32 (FIG. 1) or performs a query 40 (FIG. 1). The staff member enters 152 information identifying whether the transaction to be performed is a query about customer information, a change to the customer information, an addition of customer information or a deletion of customer information. The operator then enters 154 a field of the customer database (Table B) by which customer information is to be located. The field may be specified as either the name of the customer, the account number of the customer or the social security number of the customer. Alternatively searching for customers by account number may not be permitted, in which case searching may only be accomplished by the customer's name or social security number.

In the case where searching by account number is permitted, if the search is to be performed by account number 156 the customer's social security number is retrieved 158 from cross-reference file 160 in the RBF 108 (FIG. 4). If the customer is not to be located by account number 162, or if locating by account number is not permitted, it is then determined whether the customer is to be located by its name. If the customer is to be located by its name 164 the customer's social security number is retrieved 166 from the cross-reference file 160 of the RBF 108 (FIG. 4). If the customer is not to be located by name 168 then it must be located 170 by social security number.

An actual search 170 of the customer database file (Table B) 172 of the RBF 108 (FIG. 4) to locate the customer's record is performed by social security number. Of course, any field of the customer database file 172 having a value unique to a particular customer may alternatively be used as a search field for locating a customer's record in the customer database file. The customer database file 172 is searched 170 by social security number to determine whether a record exists for that customer. If the social security number of that customer is not found 174 a new customer record is created 176, and data provided by the customer is entered 178 into the new record. The customer data in the new record is defined and organized by reference to the master dictionary file 180 of the SPF 104 (FIG. 4). The new record is then stored in the customer database file 172 of the RBF 108 (FIG. 4). If the social security number of the customer is found 182, indicating that a record exists in the customer database file 172 for the customer, and after a new record has been created 176 for the customer, the record for the customer is retrieved 184 from the customer database file 172 of the RBF 108 (FIG. 4). The data in the record is then updated 186 from information furnished by the customer and entered 188 by the staff.

Alternatively the customer's record may be further updated 186 by information extracted from the CIF 30 by the CIF information extracting state 112 of the process 20 (FIG. 1). The updated customer record is then stored in the customer database 172 of the RBF 108 (FIG. 4).

The customer's Relationship score is determined 190 from the updated customer's record and point values assigned to the Relationships represented by the customer's record by reference to the "point" attribute of the master dictionary file (Table A) 180 of the SPF 104 (FIG. 4). The customer's vesting in the Incentive Rewards to be awarded is determined 194 based on the Relationship score by reference to the scale file 196 (Table C) in the SPF 104 (FIG. 4).

The customer's Relationship score and vesting in Incentive Rewards are stored in the customer database file 172 after they are determined. Alternatively the Relationship score is determined for each query and is not stored.

After the customer vesting is determined 194 the updated information including the new Relationship score and Incentive Reward vesting are displayed 198 by the screen data editor 128 (FIG. 5). Also, a written report may be printed 200, either on request by the staff member entering the data or automatically. Further, the Incentive Reward may be automatically credited to the customer by entering the Reward awarding state 114 and making appropriate adjustments to information in the CIF 30.

The operator specifies 202 that a new inquiry is to be made for the same customer or another customer, or that the procedures of the manual updating state 106 are at an end. If another transaction is desired 204 the operator then enters 152 the type of transaction desired to continue the procedures of the manual updating state 106. If no additional transaction is desired 206 the manual updating state 106 ends 208.

A more detailed description of the steps involved in executing the customer score determining step 190 (FIG. 6B), is illustrated in FIGS. 7A, 7B and 7C. The customer's Relationship score is initially set 212 to zero. The customer's record (row in Table B) from the customer database file 172 (FIG. 6B) which has been updated 186 (FIG. 6B) is read sequentially field-by-field (column-by-column in Table B) to determine the points for the Relationships in each field. Information regarding the attributes of the field is retrieved 214 from the master dictionary file (Table A) 180 of the SPF 104 (FIG. 4). If the "fixed" attribute of the master dictionary file 180 designates a field as a fixed field 216 it is not considered in determining the Relationship score. If the field is not designated as fixed 218 it is used in determining the Relationship score.

If the "field type" attribute from the master dictionary file (Table A) 180 designates the field as a numeric field 220 the numeric value of the field is multiplied 22 2 by a number of points set for that field by the "points" attribute from the master dictionary file (Table A) 180 to produce the points for that Relationships. If the "field type" attribute designates the field as a logical field the value of the field is a logical value, i.e., "yes" or "no". If the value of the field is "yes" 226 the points for the Relationship of that field are set 228 to the point value defined by the "points" attribute from the master dictionary file 180. If the field is designated by the "field type" attribute in the master dictionary file 180 as a date 230 the date value of the field is subtracted 232 from a present date 234 to calculate a number of years between the date value of the field and the present date 234. The point value defined by the "points" attribute from the master dictionary file 180 is multiplied 236 by the number of years to determine the points for the number of years represented by the date.

If the customer is not a joint customer with another customer of the Bank 238 the point value thus determined is the point value for the field. If however, the customer is a joint Relationship owner with another customer 240, a field of the other joint owner's database record which is the same field as the field of the customer database file 172 being read, is read and a point value is determined 242 for the corresponding field of the joint owner's record. If the master dictionary file 216 (Table A) "add joint" attribute defines the field as one for which a joint owners'points are to be added 244, the points value for that particular field to be used in calculating the customer's Relationship score is determined by adding 246 the points value for the customer's fields to the points determined for the joint owner's fields. If however the field is designated as one for which joint owner's points are not to be added 248, the customer's points value is compared 250 to the joint owner's points value for the same field. The points value assigned 252, 254 to the customer for that field is the greater of the customer's or the joint owner's points. Alternatively, a joint owner's Relationship score may not be considered in calculating the customer's points, at the option and decision of management.

The points determined for the field is then added 256 to create a running total of the Relationship score. This process repeats 258 for each field (column of Table B) of the customer database record (row of Table B) until the last field 260 has been read. The Relationship score is the total of the component Relationship scores for all of the fields of the customer's record. The Relationship score is then stored 262 in the customer database file 172 of the RBF 108 (FIG. 4).

The customer's Relationship score is then evaluated to determine 194 customer vesting. FIG. 8 illustrates details of the customer vesting determining step 194 of the manual updating state 106 (FIG. 6B). The scale file (Table C) 196 of the SPF 104 (FIG. 4) is retrieved and scanned 266 starting with the bottom row of the scale file (Table C). The value in the "above" column (Table C) retrieved from a row is compared 268 in the "above" column is compared to the customer's Relationship score. If the value on the "above" column is less than or equal to 220 the Relationship score for the customer the vesting for the customer is set 272 at the value retrieved from the "percent" column that is in the same row of the scale file (Table C) 196 as the value from the "above" column that was less than or equal to the Relationship score. The vesting percentage is then stored 274 in the customer database file 172 of the RBF 108 (FIG. 4).

The procedures performed by executing the automatic updating state 110 and the CIF information extracting state 112 of the process 20 are generally illustrated by the procedural chart in FIG. 9. The conventional program control procedure 120 establishes the operating environment in the computer 22 (FIG. 1). Data is extracted from the CIF 30 (FIG. 4) by a read CIF procedure 226 of the CIF information extracting state 112. In the automatic updating state 110 an RBF retrieving procedure 278 retrieves the customer database files and cross reference files from the RBF 108 (FIG. 4) and a system parameter retrieval procedure 280 retrieves the master dictionary file (Table A) and scale file (Table C) from the SPF 104 (FIG. 4). The information from the customer database file (Table B) is merged by a merging procedure 282 with the CIF information in accordance with parameters established by the master dictionary file (Table A) of the SPF 104 (FIG. 4). A RBF updating and storing procedure 284 and a score and vesting determining procedure 286 update the customer database and cross reference files, determine Relationship score and vesting, and store the updated customer database and cross reference files and the scores and vesting in the RBF 108 (FIG. 4).

The steps involved in executing the procedures shown in FIG. 9 of the automatic update state 110 are shown in detail in FIGS. 10A and 10B. The procedures of the automatic updating state 110 may be initiated manually 288 by member of the Bank staff, or initiated automatically 290 based on a timed schedule. For example, an automatic updating state 110 could be entered automatically each month immediately prior to preparing customers' monthly Bank statements. After the automatic updating state 110 is initiated 288 or 290 either manually or based on a time schedule, the social security numbers of the customers are retrieved 292 from the customer database file 172 of the RBF 108 (FIG. 4). For each social security number a customer record (row in Table B) is retrieved from the customer database file 172. The master dictionary file 180 is retrieved from the SPF 104 (FIG. 4) and used to define and organize the customer's record. The customer data to automatically update the record is extracted from the CIF 30 by a transition to the CIF information updating state 112 and performing the read CIF procedure 276 (FIG. 9). The record is then updated 296 in accordance with the data extracted from the CIF 30. The updated customer data record is stored in the customer database file of the RBF 180 (FIG. 4).

The updated customer data record forms the basis for determining 190 the customer Relationship score from information in the master dictionary file 180 of the SPF 104 (FIG. 4), in the same manner as described above in conjunction with FIGS. 7A, 7B and 7C for the score determining step 190 of the manual updating state 106 (FIG. 4). The customer's vesting is determined 194 from the customer's Relationship Score and from information in the scale file 196 of the SPF 104 (FIG. 4) in the same manner as described above in conjunction with FIG. 8 for the vesting determining step 194 of the manual updating state 106 (FIG. 4).

The Relationship score and vesting percentage are stored in the customer database file 172 of the RBF 108 (FIG. 4). As with the manual updating state 106 (FIG. 4), the Relationships scores and vesting percentages may alternatively be determined only upon a query. If scores and vesting are only determined on query, the scores and vesting are not stored in the customer database 172.

The updated information may also be printed 298 in an update report. Further, the Incentive Reward may be automatically credited to the customer by entering the Reward awarding state 114 and making appropriate adjustments to information in the CIF 30.

Of course, printing 298 the reports and the automatic awarding of rewards 114 may take place on a batch basis, with the information being accumulated in temporary files (not shown) for downloading to the printer 56 (FIG. 2) or 86 (FIG. 3) or to the CIF 30.

If the social security number of the record updated is the last social security number 302 in the customer database 172, the procedures of the automatic updating state 110 end 304. If it is not the last social security'number 306 the record for the next social security number is retrieved 294 and the procedures of the automatic updating state 110 are repeated.

The steps involved in executing the procedures of the report producing state 116 of the process 20 (FIG. 4) are shown in detail in the flow chart of FIGS. 11A and 11B. When a report is requested 42 (FIG. 1) by management, the procedures of the report producing state 116 are initiated by manual input 308 and 310 by a member of the Bank's staff. The staff member starts 308 the procedure then manually selects 310 the type of report to be generated. Typical reports may include: lists of all of the enrolled Relationship customers and their Relationship scores and vesting; lists identifying the Bank Relationships such as accounts, safety deposit boxes, credit cards, etc. used by each enrolled Relationship customer; form letters with information from the customer database file included by merging the information into a word processing program using a conventional mail merge operation; reports on Bank customers who are not enrolled in the program; comparisons of product usage by various categories of customers; and graphical reports.

A desired report format is retrieved 312 from a report format file 314 in the SPF 104 (FIG. 4). If the report format requires 316 information about customers who are enrolled in the program the social security numbers of the enrolled customers are retrieved 318 from the customer database file 172 of the RBF 108 (FIG. 4). For each social security number a customer record (row of Table B) is retrieved 320 from the customer database file 172 and updated 322 by data extracted from the CIF 30 by the procedures of the CIF information extracting state 112.

The Relationship scores are determined 190 in the same manner as for the score determining step 190 (FIG. 6B) of the manual updating state 106 (FIG. 4) described above in conjunction with FIGS. 7A, 7B and 7C. Customer vesting is determined 194 in the same manner as described above in conjunction with FIG. 8 for the vesting determining step 194 (FIG. 6B) of the manual updating state 106 (FIG. 4). The information required by the report format retrieved 312 from the report format file is printed 324 in a written report 44 (FIG. 1) in the format specified.

If the last social security number has not been reached 326, the steps repeat from the step of retrieving 320 the customer record. When the last social security number is reached 328, if it is not desired 330 to include non-Relationship Banking customers the operation ends 332.

If it is desired 334 to include non-Relationship Banking customers in the report, the social security numbers of the non-Relationship Banking customers are retrieved 336 from the CIF 30 by the procedures of the data extraction state 112. For each social security number the desired information for the report formats selected 310 is retrieved 338 from the CIF 30 by the procedures of the data extracting state 112. The information is printed 340 in the desired report format. If the last social security number has not been reached 342 the next social security number is retrieved 338 and the steps repeated. When the last social security number is reached 344 the procedures of the report producing state end 332.

Alternatively, the information about the customers not participating in the program may be present in the customer database file 172 and be identified by a field of the record as being a non-Relationship Banking customer. Under that alternative, data about non-Relationship Banking customers is extracted from the CIF 30 during an automatic updating state 110 of the process 20 (FIG. 1). The non-Relationship Banking customer data is then retrieved in the report producing state 116 from the customer database files 172 rather than the CIF 30. Also, the data to be printed in the report may be placed in a temporary file (not shown) and held there for batch printing after the last customer record had been processed.

The Relationship scoring and Incentive Reward awarding process 20 (FIG. 1) advantageously implements a technique for scoring Relationships that a customer has with a Bank and awarding Incentive Rewards to the customer based on specified parameters selected by the Bank management related to these Relationships. Direct access to information in the CIF 30 (FIG. 1) is provided to accurately and efficiently extract customer data 32 (FIG. 1) needed to execute the process 20. The labor required to establish, maintain and update the necessary information records is greatly reduced over a manual system and data transfer errors are substantially eliminated.

The Relationship scoring and Incentive Reward awarding process of the present invention automatically determines and tracks the Relationship score and vesting of each customer. The customer information, score and vesting are automatically updated whenever new information is furnished by the customer or Bank staff for manual input, and is further automatically updated to reflect changes in the CIF of the Bank operations computer.

The Relationship scoring and Incentive Reward awarding process can be customized to the needs of individual Banks. This customization allows the Bank to utilize a customer Incentive Reward program effectively as a management and marketing tool, providing incentives to customers for "loyalty."

The Relationship scoring and Incentive Reward awarding process is customized by modifying the SPF 104 (FIG. 4) to establish that information in the RBF 108 (FIG. 4) about Relationships between the Bank and its customers that the Bank believes is most important, and to assign Relationship score point values to those Relationships with consideration given to the marketing goals of the individual Bank. Furthermore the Relationship score required to achieve various incentive rewards can be adjusted to meet the individual needs of the Bank. The SPF 104 (FIG. 4) can also be customized to provide those management reports that the Bank management believes are most useful, and to place them in a format usable by management. In addition to being initially customizable, the values and features established in the SPF 104 (FIG. 4) can be changed by Bank's management as the Banks marketing needs change.

A preferred embodiment of the present invention has been described with some particularity. It will be understood by those skilled in the art that many variations of the described embodiment are possible, beyond those specifically mentioned. It should be understood this description has been made by way of preferred example, and that the invention is defined by the scope of the following claims.

The invention claimed is:

1. A process for scoring a Relationship that a customer has with a Financial Institution and awarding an Incentive Reward to the customer based on a Relationship score using a computer having a memory, comprising:

maintaining a customer information file in memory of the computer which contains data identifying a plurality of customers of the Financial Institution and identifying a plurality of different Relationships each of the customers has with the Financial Institution;

storing data in the memory of the computer which represents a point value assigned to each of the plurality of different Relationships that are offered to customers by the Financial Institution;

storing data in the memory of the computer which specifies the Relationships that the customer has with the Financial Institution;

correlating the Relationships that the customer has with the Financial Institution and the point value assigned to that Relationship by using the computer to access the data stored in the memory;

computing a Relationship score for the customer by using the computer to total the point values correlated with the Relationships that the customer has with the Financial Institution;

comparing the Relationship score to value in a vesting scale to determine an amount of vesting;

awarding an Incentive Reward to the customer based on the Relationship score;

creating a customer database file in memory of the computer which contains a customer record for each customer and a plurality of fields;

creating a master dictionary file in memory of the computer which contains a plurality of attributes which describe the information contained in the fields of the customer record; and computing the Relationship score by making a computation using the information in the fields of the customer record of the customer database file and an attribute of the master dictionary file.

2. The process of claim 1, wherein in said creating the master dictionary step, at least one attribute describes at least one field to be used in computing the Relationship score and another attribute describes the information in the field as a point value associated with each Relationship.

* * * * *